(12) United States Patent
Soryal et al.

(10) Patent No.: US 12,537,811 B2
(45) Date of Patent: Jan. 27, 2026

(54) GATEWAY CERTIFICATE MANAGEMENT

(71) Applicants: AT&T Intellectual Property I, L.P., Atlanta, GA (US); Interwise Ltd., Airport City (IL)

(72) Inventors: Joseph Soryal, Glendale, NY (US); Molly A. Hutsler, Gainesville, GA (US); Teague Carney, Mount Ephraim, NJ (US); Brittney Smith, Clarkston, GA (US); William Coleman, Suwanee, GA (US); Itiel Maayan, Shoham (IL); Yanko Torralba, Flower Mound, TX (US)

(73) Assignees: AT&T Intellectual Property L.L.P., Atlanta, GA (US); Interwise Ltd., Airport City (IL)

( * ) Notice: Subject to any disclaimer, the term of this patent is extended or adjusted under 35 U.S.C. 154(b) by 63 days.

(21) Appl. No.: 18/385,424

(22) Filed: Oct. 31, 2023

(65) Prior Publication Data
US 2025/0141861 A1 May 1, 2025

(51) Int. Cl.
H04L 9/40 (2022.01)
(52) U.S. Cl.
CPC ........ H04L 63/0823 (2013.01); H04L 63/108 (2013.01); H04L 63/20 (2013.01)
(58) Field of Classification Search
CPC ... H04L 63/0823; H04L 63/108; H04L 63/20; H04L 63/102
See application file for complete search history.

(56) References Cited

U.S. PATENT DOCUMENTS

| 11,805,127 B1* | 10/2023 | Sundar | H04L 63/0884 |
| 2016/0014078 A1* | 1/2016 | Schrecker | H04L 63/20 726/12 |
| 2019/0149514 A1* | 5/2019 | Jawahar | H04L 63/10 726/7 |
| 2020/0169471 A1* | 5/2020 | Dhawan | H04L 67/06 |
| 2022/0398322 A1* | 12/2022 | Kumar | G06F 21/575 |

* cited by examiner

Primary Examiner — Anh Nguyen
(74) Attorney, Agent, or Firm — Hartman & Citrin LLC

(57) ABSTRACT

Gateway certificate management can include detecting, at a gateway device located at a premises, a connection between the gateway device and a user device located at the premises. The connection can be created to request communications between the user device and a resource that is not located at the premises. The gateway device can determine if a certificate should be issued for the communications and can analyze a profile associated with the user device and a context associated with the communications, wherein the context comprises information identifying a type of data to be communicated via the communications. The gateway device can generate the certificate, the certificate including custom certificate data including communication context data that defines the type of data. The gateway device can enable the communications to allow the user device to communicate with the resource via the gateway device to send and receive the type of data.

20 Claims, 10 Drawing Sheets

GATEWAY CERTIFICATE MANAGEMENT

BACKGROUND

Various technologies exist for supporting secure communications. In some instances, digital security certificates can be installed in one or more devices to enable secure communications. The certificates may be issued by a certificate authority and installed on two or more devices for use until an expiration date (typically included as part of the certificate). Once a secure communication channel is created between the devices, secure communications of any type can be enabled.

Various technologies also exist for content filtering and/or control. In particular, in a home or business environment, a router or gateway can be configured to apply address and/or content filtering to limit the types of data that can be sent and/or consumed by devices communicating via the router or gateway. Such limits can be applied to all users that connect via the router and/or gateway and therefore can be used to control access at a particular location. Alternatively, device-level filtering can be used to limit certain types of content for consumption at a device with or without using filtering and/or content control at the router or gateway level (e.g., by filtering content and/or addresses). Such approaches can be used to block offensive content in whole when filters or content control rules are triggered.

SUMMARY

The present disclosure is directed to gateway certificate management. According to various embodiments of the concepts and technologies disclosed herein, a gateway device can be configured to create and distribute certificates for communications with and/or via the gateway device (by user devices that connect to other networks via the gateway device). The certificates can also be configured to include custom certificate data (in addition to information identifying a holder, a unique identifier, expiration information, and/or a public key). The custom certificate data can include, in some embodiments, communication context data that can define what types of communications are or are not authorized for communications with and/or via the gateway device.

The custom certificate data also can include, in some embodiments, user data that can define what users and/or devices are authorized to communicate with and/or via the gateway device. The user data can be set to limit what devices and/or users can connect with and/or via the gateway device. The custom certificate data also can include, in some embodiments, time data that can define what times, durations, days, etc., the users and/or devices are authorized to communicate with and/or via the gateway device. Thus, the time data can be set to limit what days, dates, times of day, and/or durations for which devices and/or users can connect with and/or via the gateway device. The custom certificate data also can include, in some embodiments, content data that can define what specific limits on content (e.g., violent content, explicit content, hate speech, etc.) users and/or devices are authorized to consume via the gateway device. Thus, the content data can be used to set content-based exceptions to otherwise permissible data (e.g., video may be allowed by the certificate, but if violent scenes are detected that content may not be authorized by the certificate and can be temporarily blocked, in some example embodiments).

The custom certificate data also can include, in some embodiments, location data that can define geographic locations at which users and/or devices are authorized to communicate with and/or via the gateway device (e.g., even if within communication range at a premises associated with the gateway device, some communications may not be allowed unless within more narrowly defined locations such as in room x, within five yards of the gateway device, or the like). The custom certificate data also can include, in some embodiments, application data that can define what applications may and/or may not be used for otherwise authorized communications with and/or via the gateway device. From the above, it can be appreciated that the concepts and technologies disclosed herein can be used to limit content authorized by a certificate in terms of communication context, time, user, content, location, application, or the like; and not to merely enable or disable all communications based on a certificate. It should be understood that this example embodiment is illustrative, and therefore should not be construed as being limiting in any way.

A gateway device can be configured to communicate with a user device (e.g., after the user device has registered for communications with the gateway device or the like). The gateway device can be configured to monitor activity of the user device and can be configured to generate one or more profiles for users and/or devices that communicate with and/or via the gateway device. The profiles can be built by the gateway device based on activity of the user device (or other device) and stored, in some embodiments, at the gateway device and/or at a storage location accessible by the gateway device. When a user device requests a connection via the gateway device, the gateway device can be configured to analyze the communications being requested (via the connection) and the profile to determine if a certificate to enable the communications should be issued. Thus, the gateway device can be configured to issue a certificate for each instance of communications (e.g., each data session, each new connection, each new file transfer, or the like) instead of as a blanket authorization that typically may be enabled by a certificate. It should be understood that this example embodiment is illustrative, and therefore should not be construed as being limiting in any way.

The gateway device also can set communication context limitations, user limitations, time limitations, content limitations, location limitations, application limitations, and/or other limits as part of the certificate. Furthermore, because the gateway device can possess a copy of the certificate (to enable communications between the gateway device and the user device), it can be appreciated that the communications can be immediately revoked and/or temporarily suspended by the gateway device (e.g., by revoking the certificate, by modifying the certificate, or the like). Thus, the concepts and technologies disclosed herein can enable granular control of content sent and/or received by devices communicating via the gateway device via issuing, modifying, suspending, and/or revoking certificates issued by the gateway device.

According to one aspect of the concepts and technologies disclosed herein, a system is disclosed. The system can include a processor and a memory. The memory can store computer-executable instructions that, when executed by the processor, cause the processor to perform operations. The operations can include detecting, at a gateway device, a connection between the gateway device and a user device. The gateway device can be located at a premises and wherein the user device can be located at the premises. The connection can be created to request communications between the user device and a resource that is not located at the premises. The operations further can include determining if a certificate should be issued for the communications requested via the connection; and analyzing a profile associated with the user device and a context associated with the communications. The context can include information identifying a type of data to be communicated via the communications. The operations further can include generating the certificate. The certificate can include custom certificate data including communication context data that defines the type of data, and the certificate can authorize the user device to send and receive the type of data. The operations also can include enabling the communications to allow the user device to communicate with the resource via the gateway device to send and receive the type of data.

In some embodiments, the context of the communications further can include information that can identify a timing associated with the communications; an application to be used for the communications; and a user associated with the user device for the communications. In some embodiments, the custom certificate data further can include user data that can identify users authorized to send and receive the communications, the users including the user; time data that can identify times at which the user device is authorized to send and receive the communications; and application data that can identify an application that can be used to send and receive the communications. In some embodiments, the time data can define a first time at which the user device can send and receive the communications and a second time at which the user device can not send and receive the communications.

In some embodiments, the profile can be generated by the gateway device using machine learning and artificial intelligence to analyze communications associated with the user device. In some embodiments, the computer-executable instructions, when executed by the processor, cause the processor to perform operations further including analyzing, during the communications, content associated with the communications to determine that the communications are not authorized by the certificate; and issuing a modification to the certificate in response to the determining, wherein the modification suspends the communications. In some embodiments, analyzing the content can include analyzing a screenshot associated with the content, and issuing the modification can include changing time data associated with the certificate to temporarily suspend validity of the certificate.

According to another aspect of the concepts and technologies disclosed herein, a method is disclosed. The method can include detecting, at a gateway device including a processor, a connection between the gateway device and a user device. The gateway device can be located at a premises and the user device can be located at the premises. The connection can be created to request communications between the user device and a resource that is not located at the premises. The method also can include determining, by the gateway device, if a certificate should be issued for the communications requested via the connection; and analyzing, by the gateway device, a profile associated with the user device and a context associated with the communications. The context can include information identifying a type of data to be communicated via the communications. The method also can include generating, by the gateway device, the certificate. The certificate can include custom certificate data that can include communication context data that defines the type of data. The certificate can authorize the user device to send and receive the type of data. The method also can include enabling, by the gateway device, the communications to allow the user device to communicate with the resource via the gateway device to send and receive the type of data.

In some embodiments, the context of the communications further can include information that can identify a timing associated with the communications; an application to be used for the communications; and a user associated with the user device for the communications. In some embodiments, the custom certificate data further can include user data that can identify users authorized to send and receive the communications, the users including the user; time data that can identify times at which the user device is authorized to send and receive the communications; and application data that can identify an application that can be used to send and receive the communications. In some embodiments, the time data can define a first time at which the user device can send and receive the communications and a second time at which the user device can not send and receive the communications.

In some embodiments, the profile can be generated by the gateway device using machine learning and artificial intelligence to analyze communications associated with the user device. In some embodiments, the method further can include analyzing, during the communications, content associated with the communications to determine that the communications are not authorized by the certificate; and issuing a modification to the certificate in response to the determining, wherein the modification suspends the communications. In some embodiments, analyzing the content can include analyzing a screenshot associated with the content, and issuing the modification can include changing time data associated with the certificate to temporarily suspend validity of the certificate.

According to yet another aspect of the concepts and technologies disclosed herein, a computer storage medium is disclosed. The computer storage medium can store computer-executable instructions that, when executed by a processor, cause the processor to perform operations. The operations can include detecting, at a gateway device, a connection between the gateway device and a user device. The gateway device can be located at a premises and the user device can be located at the premises. The connection can be created to request communications between the user device and a resource that is not located at the premises. The operations further can include determining if a certificate should be issued for the communications requested via the connection; and analyzing a profile associated with the user device and a context associated with the communications. The context can include information identifying a type of data to be communicated via the communications. The operations further can include generating the certificate. The certificate can include custom certificate data including communication context data that defines the type of data, and the certificate can authorize the user device to send and receive the type of data. The operations also can include enabling the communications to allow the user device to communicate with the resource via the gateway device to send and receive the type of data.

In some embodiments, the context of the communications further can include information that can identify a timing associated with the communications; an application to be used for the communications; and a user associated with the user device for the communications. In some embodiments, the custom certificate data further can include user data that can identify users authorized to send and receive the communications, the users including the user; time data that can and receive the communications; and application data that can identify an application that can be used to send and receive the communications. In some embodiments, the time data can define a first time at which the user device can send and receive the communications and a second time at which the user device can not send and receive the communications.

In some embodiments, the profile can be generated by the gateway device using machine learning and artificial intelligence to analyze communications associated with the user device. In some embodiments, the computer-executable instructions, when executed by the processor, cause the processor to perform operations further including analyzing, during the communications, content associated with the communications to determine that the communications are not authorized by the certificate; and issuing a modification to the certificate in response to the determining, wherein the modification suspends the communications. In some embodiments, analyzing the content can include analyzing a screenshot associated with the content, and issuing the modification can include changing time data associated with the certificate to temporarily suspend validity of the certificate.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
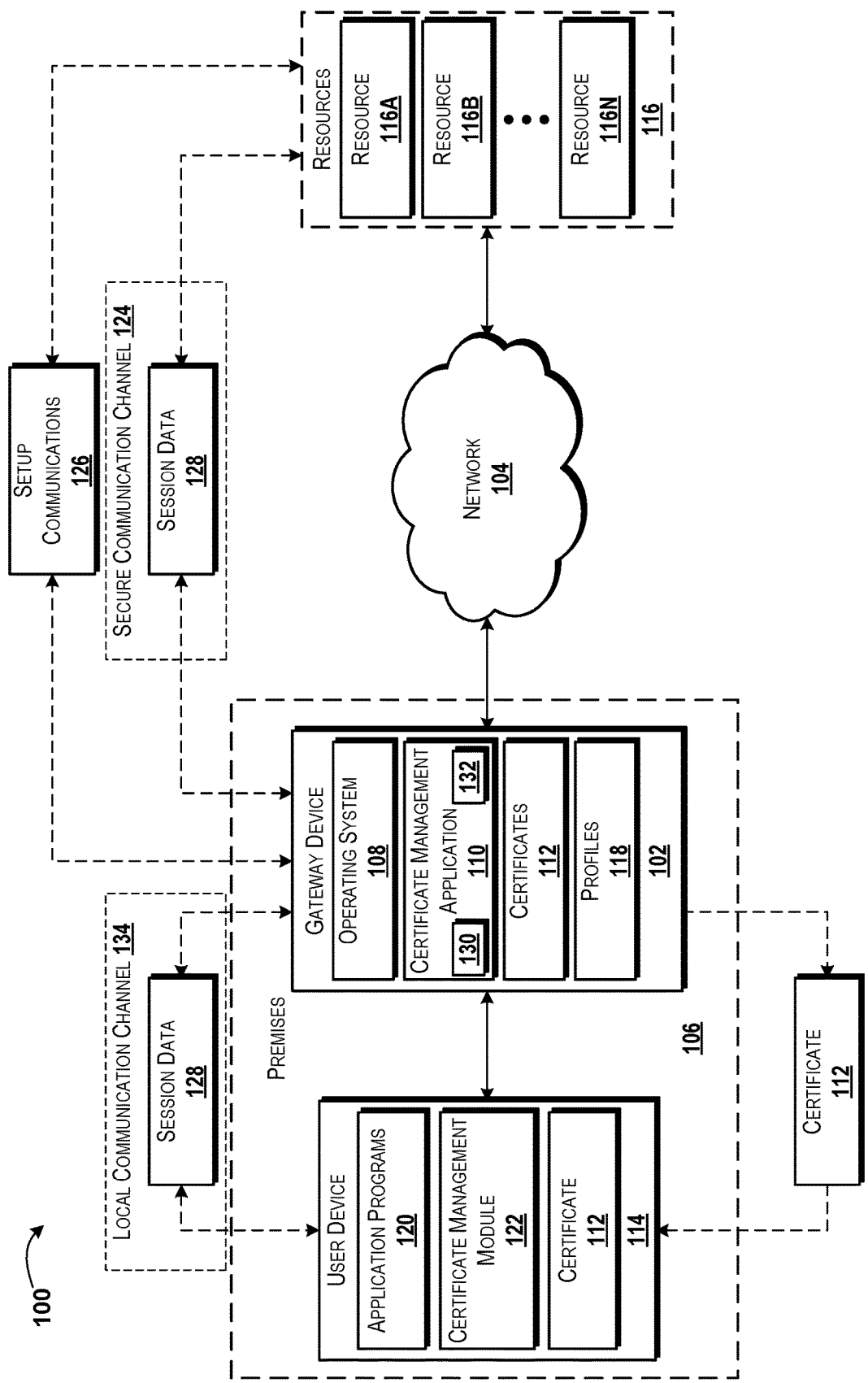
FIG. 1 is a system diagram illustrating an illustrative operating environment for various embodiments of the concepts and technologies described herein.

The following detailed description is directed to gateway certificate management. In some embodiments of the concepts and technologies disclosed herein, a gateway device can be configured to create and distribute instance-based certificates for communications with and/or via the gateway device (by user devices that connect to other networks via the gateway device). The certificates can be issued for each communication instance (instead of being issued to authorize any communications) and can also be configured to include custom certificate data (in addition to information identifying a holder, a unique identifier, expiration information, and/or a public key).

The custom certificate data can include, in some embodiments, communication context data that can define what types of communications are or are not authorized for communications with and/or via the gateway device; user data that can define what users and/or devices are authorized to communicate with and/or via the gateway device; time data that can define what times, durations, days, etc., the users and/or devices are authorized to communicate with and/or via the gateway device; content data that can define content limits (e.g., violent content, explicit content, hate speech, etc.); location data that can define geographic locations at which users and/or devices are authorized to communicate with and/or via the gateway device; application data that can define what applications may and/or may not be used for otherwise authorized communications with and/or via the gateway device; and/or other data. Thus, embodiments of the concepts and technologies disclosed herein can be used to limit content authorized by a certificate in terms of communication context, time, user, content, location, application, or the like; and not to merely enable or disable all communications based on a certificate. It should be understood that this example embodiment is illustrative, and therefore should not be construed as being limiting in any way.

A gateway device can be configured to communicate with a user device (e.g., after the user device has registered for communications with the gateway device or the like). The gateway device can be configured to monitor activity of the user device and can be configured to generate one or more profiles for users and/or devices that communicate with and/or via the gateway device. The profiles can be built by the gateway device based on activity of the user device (or other device) and stored, in some embodiments, at the gateway device and/or at a storage location accessible by the gateway device. When a user device requests a connection via the gateway device, the gateway device can be configured to analyze the communications being requested (via the connection) and the profile. Based on this analysis, the gateway device can be configured to determine if a certificate to enable the communications should be issued. Thus, the gateway device can be configured to issue a certificate for each instance of communications (e.g., each data session, each new connection, each new file transfer, or the like) instead of as a blanket authorization that typically may be enabled by a certificate. It should be understood that this example embodiment is illustrative, and therefore should not be construed as being limiting in any way.

The gateway device also can set communication context limitations, user limitations, time limitations, content limitations, location limitations, application limitations, and/or other limits as part of the certificate. Furthermore, because the gateway device can possess a copy of the certificate (to enable communications between the gateway device and the user device), it can be appreciated that the communications can be immediately revoked and/or temporarily suspended by the gateway device (e.g., by revoking the certificate, by modifying the certificate, or the like). Thus, the concepts and technologies disclosed herein can enable granular control of content sent and/or received by devices communicating via the gateway device via issuing, modifying, suspending, and/or revoking certificates issued by the gateway device.

During the authorized communications, the gateway device can be configured to determine if any content restrictions are not being followed. In some embodiments, the gateway device can use artificial intelligence and/or machine learning to analyze the content and detect any content restrictions that may be violated (e.g., violent content, explicit content, hate speech, or the like). If any such violation is detected, the gateway device can be configured to temporarily suspend the certificate (e.g., to modify the time data of the certificate to temporarily cause the certificate to be invalid and to again modify the time data later to make the certificate valid again when the content restriction violation is stopped). It should be understood that this example embodiment is illustrative, and therefore should not be construed as being limiting in any way. Thus, content flow can be disrupted by the gateway device using the certificates without revoking the certificates in some instances. It should be understood that this example embodiment is illustrative, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for gateway certificate management will be described, according to an illustrative embodiment. The operating environment 100 shown in FIG. 1 includes a gateway device 102. The gateway device 102 can operate in communication with and/or as part of a communications network ("network") 104. As is generally understood, the gateway device 102 can connect to any number of devices, networks, addresses, or the like via the network 104, and also can act as an intermediary between devices local to (e.g., in a local communication range of) the gateway device 102 and external devices that are not local to the gateway device 102. For purposes of the description herein and the claims, a first device can be considered to be in a local communication range of a second device if the first device is within the range of a WiFi device of the second device, a BLUETOOTH device of the second device, or the like. It should be understood that these example embodiments are illustrative, and therefore should not be construed as being limiting in any way.

According to various embodiments of the concepts and technologies disclosed herein, the functionality of the gateway device 102 may be provided by one or more home gateway devices, home routers, business gateways, various types of customer premises equipment ("CPE"), other computing devices, and/or the like. It should be understood that the functionality of the gateway device 102 may be provided by a single device, by two or more similar devices, and/or by two or more dissimilar devices. For purposes of describing the concepts and technologies disclosed herein, the gateway device 102 is described herein as a gateway device for a physical location or premises ("premises") 106 such as a home, office, business, or the like (e.g., a home gateway device, or the like). According to various embodiments of the concepts and technologies disclosed herein, the boundaries of the premises can be defined as the extents of a radio-based networking device of the gateway device 102, meaning a WiFi range of the gateway device 102, a BLUETOOTH range of the gateway device 102, or the like. It should be understood that this embodiment is illustrative, and should not be construed as being limiting in any way.

The gateway device 102 can execute an operating system 108 and one or more application programs such as, for example, a certificate management application 110. The operating system 108 can include a computer program that can control the operation of the gateway device 102. The certificate management application 110 can include an executable program that can be configured to execute on top of the operating system 108 to provide various functions as illustrated and described herein for providing gateway certificate management.

As will be explained in more detail below, the certificate management application 110 can be configured to detect data communications between one or more entities (e.g., a user device 114 that can be associated with and/or located at the premises 106 and one or more resources 116A-N (hereinafter collectively and/or generically referred to as "resources 116") that are not located at the premises 106), to determine if certificates 112 should be issued and/or used for the detected data communications, to create certificates 112, to distribute certificates 112 to entities associated with the data communications, to manage (e.g., edit, change, and/or revoke) the certificates 112, or the like. The certificate management application 110 also can be configured to create, store, and use profiles 118 that can model and/or represent data communications associated with one or more users (e.g., a user of the user device 114 for example) to determine if certificates 112 should be used, modified, revoked, or the like. These and other gateway certificate management functions of the certificate management application 110 will be illustrated and described in more detail below after introducing additional components of the operating environment 100 illustrated in FIG. 1.

As shown in FIG. 1, the operating environment 100 also can include the user device 114, as mentioned above. According to various embodiments, the user device 114 can include a mobile phone, a smartphone, a tablet device, a laptop computer, an Internet-of-things device, and/or another device or devices that can be configured to communicate with the gateway device 102. It can be appreciated that in various embodiments of the concepts and technologies disclosed herein, the user device 114 can be located at or near the premises 106 (or at least in a local communication range of the gateway device 102). For purposes of illustrating and describing the concepts and technologies disclosed herein, the user device 114 will be described as a smartphone. It should be understood that this example embodiment is illustrative, and therefore should not be construed as being limiting in any way.

The user device 114 can be configured to execute an operating system (not shown in association with the user device 114 in FIG. 1) and one or more application programs 120. The application programs 120 can provide various functionality for the user device 114 and therefore can include, for example, web browsers, applications, or the like. The application programs 120 also can include and/or can communicate with a certificate management module 122. The certificate management module 122 can include an executable program, routine, subroutine, module, or the like. The certificate management module 122 can be configured to provide various functions as illustrated and described herein for using certificates 112 issued by the certificate management application 110 and/or used for communicating with entities (e.g., the resources 116) via the gateway device 102. These and other gateway certificate management functions of the certificate management module 122 will be explained in more detail below after introducing additional components of the operating environment 100 illustrated in FIG. 1.

As shown in FIG. 1, the gateway device 102 also can be configured (e.g., via execution of the certificate management application 110) to communicate with one or more of the resources 116 to create a secure communication channel 124 between the gateway device 102 and the resources 116. The secure communication channel 124 can include, in some instances, a tunnel between the gateway device 102 and the resources 116. It can be appreciated with reference to FIG. 1 that the secure communication channel 124 can include the gateway device 102, e.g., the gateway device 102 can be configured to receive, send, and/or relay the session data 128 between the user device 114 and the resource 116 in some embodiments. It should be understood that this example embodiment is illustrative, and therefore should not be construed as being limiting in any way.

Now that the various components of the operating environment 100 have been briefly discussed, the functionality of the certificate management application 110 will be described in additional detail. According to various embodiments of the concepts and technologies disclosed herein, the certificate management application 110 can be configured to detect communications associated with and/or originating at one or more devices such as the user device 114. According to various embodiments of the concepts and technologies disclosed herein, the communications that are detected by the gateway device 102 can be directed to and/or conducted with one or more resources or other devices or entities outside of the premises 106. It should be understood that many devices that are located at or near the premises 106 can connect to various networks and/or devices (e.g., the resources 116) via the gateway device 102, so the example of the user device 114 is illustrative and should not be construed as being limiting in any way.

As noted above, communications between the user device 114 and one or more of the resources 116 can be requested by the user device 114 and/or the resources 116. For example, the user device 114 may request a connection to one or more of the resources 116 (e.g., by requesting a particular link such as a uniform resource locator ("URL") at the user device 114, by navigating to a file, by requesting a file or connection, or the like). The gateway device 102 can be configured (e.g., via the certificate management application 110 and/or other applications or modules) to initiate a connection between the user device 114 and the resources 116 (e.g., via a tunnel, data stream, or other connection) via the gateway device 102. As such, it can be appreciated that the gateway device 102 can communicate with the resources 116 and relay data between the user device 114 and the resources 116. It should be understood that this example embodiment is illustrative, and therefore should not be construed as being limiting in any way.

According to various embodiments of the concepts and technologies disclosed herein, the gateway device 102 can be configured to exchange one or more setup communications 126 with the one or more resources 116 to create the connection between the gateway device 102 and the one or more resources 116. In some contemplated embodiments, the setup communications 126 can specify the contours of a virtual private network ("VPN") connection, tunnel, or other networking connection that can connect the gateway device 102 (and thereby the user device 114) and the one or more resources 116. It should be understood that this example embodiment is illustrative, and therefore should not be construed as being limiting in any way.

Based on the setup communications 126 and/or based on other communications, a secure communication channel 124 can be created between the gateway device 102 and the one or more resources 116. It should be understood that in some embodiments, the secure communication channel 124 can be created between the gateway device 102 and the one or more resources 116 and the session data 128 exchanged by the user device 114 and the resources 116 can be relayed between the user device 114 and the resources 116 by the gateway device 102. Thus, a secure communication channel 124 can include the gateway device 102 in some embodiments, where the gateway device 102 can relay the session data 128 between the user device 114 and the resources 116. It should be understood that this example embodiment is illustrative, and therefore should not be construed as being limiting in any way.

Regardless of how the secure communication channel 124 is created, the session data 128 can be exchanged via the secure communication channel 124 and the gateway device 102 can be configured to detect the communications between the user device 114 and the resources 116. Upon detecting the communications, the certificate management application 110 can be configured to determine if a profile 118 exists for the user device 114 (or other device) that is associated with the communications (e.g., that is exchanging the session data 128 with the resources 116). The profiles 118 can include, for each device that is registered to communicate with and/or via the gateway device 102, information that can define what types of applications are allowed or disallowed, what kinds of sessions are allowed or disallowed, what kind of data or streams are allowed or disallowed, combinations thereof, or the like. The contours of the profiles 118 (e.g., content permissions or restrictions, application permissions or restrictions, time permissions or restrictions, combinations thereof, or the like) can be defined by one or more registered users or owners of the gateway device 102. In some contemplated embodiments of the concepts and technologies disclosed herein, a user or owner can log into a portal supported by the gateway device 102 to create one or more profiles 118 and/or to set and/or modify one or more permissions or restrictions associated with a user or profile 118, though this functionality is not separately illustrated in the FIGURES. It should be understood that this example embodiment is illustrative, and therefore should not be construed as being limiting in any way.

Additionally, or alternatively, the contours of the profiles 118 can be determined and set by the certificate management application 110. In particular, some embodiments of the certificate management application 110 can include a module, application, routine, subroutine, or the like for providing a profile generator module 130. The profile generator module 130 can include machine learning for learning behavior of individual users (e.g., specific devices such as the user device 114, or users associated with one or more of the devices, or the like). In some embodiments of the concepts and technologies disclosed herein, the profile generator module 130 can be configured to analyze the session data 128 and to determine, based on the analysis of the session data 128 using the artificial intelligence and/or machine learning, the behavior associated with the one or more users or devices. For example, if the session data 128 is associated with a video session, the profile generator module 130 can periodically capture screenshots associated with the video (or obtain the screenshots from other entities) and analyze the screenshots to determine what kinds of data are permitted, restricted, and/or used by the device or user. The contours of the content that is permitted and/or restricted can be added by the profile generator module 130 and/or the certificate management application 110 to one or more profiles 118. It should be understood that this example embodiment is illustrative, and therefore should not be construed as being limiting in any way.

Some embodiments of the certificate management application 110 can also include a module, application, routine, subroutine, or the like for providing a session data analysis module 132. The session data analysis module 132 can include machine learning for determining contents of data being received or sent as the session data 128. This analysis can be used to determine if the content that is being sent or received is allowed or restricted by the profiles 118 and/or certificates 112 associated with the individual users (e.g., specific devices such as the user device 114, or users associated with one or more of the devices, or the like). In some embodiments of the concepts and technologies disclosed herein, the session data analysis module 132 can be configured to analyze the session data 128 and to determine, based on the analysis of the session data 128 using the artificial intelligence and/or machine learning, what kind of content is being sent or received. For example, if the session data 128 is associated with a video session, the session data analysis module 132 can periodically capture screenshots associated with the video (or obtain the screenshots from other entities) and analyze the screenshots to determine what kinds of data are being exchanged (e.g., what type of video content or the like) and whether or not such content is permitted or restricted for use by the device or user. It should be understood that this example embodiment is illustrative, and therefore should not be construed as being limiting in any way.

According to various embodiments of the concepts and technologies disclosed herein, the certificate management application 110 can also be configured to manage the creation, modification, and/or revocation of certificates 112. The certificates 112 created, modified, and/or revoked by the certificate management application 110 can be user-aware (e.g., associated with a particular device or user of a device); application-aware (e.g., associated with a particular application or service); context-aware (e.g., associated with particular data or types of data, content of the data or types of data, etc.); location-aware (e.g., associated with a particular geographic location or area); and/or time-aware (e.g., temporally limited so that the certificate 112 can be automatically revoked after a particular amount of time, etc.).

As such, the certificates 112 illustrated and described herein can be limited in terms of user, device, application, content, location, time, etc. Thus, the certificates 112 issued and/or used herein can be limited to a per-user or per-instance basis (e.g., a particular function of an application, a particular data session, a particular data use, a particular user or device, etc.). Thus, the certificates 112 can be granted and may only allow communications associated with a single instance of data, data session, application use, content, or the like for which the instance-limited certificate 112 was created and/or granted. Once the user device 114 attempts to obtain another instance of data, start a new data session, use an application, obtain content, or the like (in addition to that instance granted by the certificates 112), the communication can be disallowed, or the certificate 112 can be modified or revoked, thereby providing a gateway-based and therefore network-wide halt on any such attempt (instead of having to manage traffic at the gateway device 102 or the like, the link can effectively be severed by the gateway device 102). It should be understood that this example embodiment is illustrative, and therefore should not be construed as being limiting in any way.

According to various embodiments of the concepts and technologies disclosed herein, the certificates 112 (which as noted above, can be limited to use on a per-user, per instance, or the like basis) can be used to create and/or enable creation of one or more secure channels such as, for example, the secure communication channel 124 illustrated and described herein. The creation of the certificates 112 will be explained in more detail herein, but once created, the gateway device 102 can be configured to send the certificates 112 (or copies thereof) to the other party to the communication instance for which the certificates 112 were created (e.g., the user device 114), and to maintain a copy of the certificate 112 at the gateway device 102 to enable communications between the user device 114 and the gateway device 102. The certificates 112 can be used for a connection established between the user device 114 and the gateway device 102 in association with the communications (e.g., for the session data 128). As such, it can be appreciated that the user device 114 and the gateway device 102 can use the certificates 112 for creating and/or transmitting the session data 128 via a local communication channel 134 between the user device 114 and the gateway device 102 (which can also be used for the relay and/or exchange of session data 128 as shown in FIG. 1). It should be understood that this example embodiment is illustrative, and therefore should not be construed as being limiting in any way.

Furthermore, it can be appreciated that if the certificate 112 is revoked by the gateway device 102 (e.g., via the certificate management application 110), the local communication channel 134 can effectively be terminated (e.g., by breaking the authentication between the user device 114 and the gateway device 102). Thus, it can be appreciated that the use of the certificates 112 illustrated and described herein can provide real-time control of the local communication channel 134 (e.g., by allowing instant teardown of the local communication channel 134 via editing or revoking the certificate 112). Furthermore, as will be explained in additional detail herein, the real-time modification of the certificates 112 can be used to enable real-time (e.g., instantaneous) blocking of the session data 128 (e.g., when a content scope exceeds the scope of the data session in which the content is being shared). It should be understood that this example embodiment is illustrative, and therefore should not be construed as being limiting in any way.

According to some other embodiments of the concepts and technologies disclosed herein, the certificates 112 can be used to enable temporary access for devices in, at, or near the premises 106. For example, a user of the user device 114 may wish to obtain a ride from a rideshare provider that is located at or near the premises 106. The user device 114 can submit a request for services from the rideshare provider, and the rideshare provider can be granted a temporally-limited and/or location-limited certificate 112 that can permit the device of the rideshare provider to function as a resource 116 (e.g., to connect to the gateway device 102 and/or to the user device 114 via the gateway device 102 to conduct communications with the user device 114). Once the device of the rideshare provider leaves the premises 106 and/or the time for the ride passes, the certificate 112 (that was limited by location and/or time) can be revoked or can expire, and the connection can thereby be terminated.

As such, it can be appreciated that the use of limited certificates 112 such as those illustrated and described herein can provide control of access for various devices located at or near the premises 106 (e.g., in local communication range of the gateway device 102). Thus, it can be appreciated that the certificates 112 can be used in various embodiments of the concepts and technologies disclosed herein to enable temporary access to devices at or near the premises 106 to enable and/or disable access via the gateway device 102. It should be understood that this example embodiment is illustrative, and therefore should not be construed as being limiting in any way.

According to various embodiments of the concepts and technologies disclosed herein, the gateway device 102 (e.g., via execution of the certificate management application 110) can detect communications that are requested or are occurring via the gateway device 102. For example, the gateway device 102 can detect an attempt to communicate and/or an actual communication between a device such as the user device 114 and one or more resources 116. The gateway device 102 can inspect data being communicated between the devices to determine or identify a user (e.g., a device or a user associated with the device) associated with the communications. The user associated with the communications can be identified, for example, by identifying a device that requested the communications, by identifying an endpoint associated with the communications (e.g., an origin or destination), by examining keys or the like being used in association with the communications, combinations thereof, or the like. The gateway device 102 can determine if a profile 118 exists for the user (device or user of the device) identified.

If the gateway device 102 determines that a profile 118 for the user exists and/or is stored by the gateway device 102, the gateway device 102 can be configured to modify the profile 118 based on the activity (e.g., communications content, timing, user, device used, etc.) and store the updated profile 118 as one of the profiles 118. Thus, it can be appreciated that a library of profiles 118 can be maintained for the devices and/or users that connect to and/or via the gateway device 102 and/or can be updated based on activity detected for the users that connect to and/or via the gateway device 102 so that the profiles 118 can correspond to models of behavior associated with the users and/or devices that connect to and/or via the gateway device 102. Additional uses of the profiles 118 will be illustrated and described in more detail herein.

If the gateway device 102 determines that a profile 118 for the user does not exist, the gateway device 102 can be configured to analyze the data exchanged in the communications to determine a user and/or device at or near the premises, the user or device being associated with the data (e.g., the user device 114); contextual information such as the type of content being obtained and/or sent, the time of day at which the communications are occurring, the time length of the data communications (e.g., a duration of the session or stream), or the like; permissions associated with the user device 114 for the session; or the like. The gateway device 102 also can be configured to create a profile 118 based on the activity (e.g., communications content, timing, user, device used, etc.) and store the profile 118 as one of the profiles 118. Thus, it can be appreciated that a library of profiles 118 can be generated for the devices and/or users that connect to and/or via the gateway device 102 and/or can be updated based on activity detected for the users that connect to and/or via the gateway device 102 so that the profiles 118 can correspond to models of behavior associated with the users and/or devices that connect to and/or via the gateway device 102. Additional uses of the profiles 118 will be illustrated and described in more detail herein.

In some instances, the gateway device 102 can detect communications occurring via the gateway device 102 (e.g., between the user device 114 and a resource 116). The gateway device 102 can be configured to inspect the data being communicated via the gateway device 102 to determine if a certificate 112 should be used for the communications. The determination as to whether a certificate 112 (in particular, the time-limited, context-limited, user-limited certificates 112 as illustrated and described herein) should be used for the communications can be made in some instances based on configurations or settings that can define when a certificate should or should not be used, a user associated with the communications, or the like. The certificate 112 can be used to control the connection between the user device 114 and the gateway device 102 and/or to control content that can be obtained by the user device 114 via the gateway device 102 without using filtering or other access control mechanisms. Thus, embodiments of the concepts and technologies disclosed herein can use certificates 112 to instantly stop communications between a user device 114 and a resource 116 that occurs via the gateway device 102.

In particular, the gateway device 102 can be configured such that communications associated with some users or devices will require a certificate 112 if occurring via the gateway device 102. Thus, for example, an owner or operator of the gateway device 102 may indicate that all communications of a child, guest, or other user (and/or particular devices) that occur via the gateway device 102 may require issuance of a certificate 112. Thus, for example, a parent or other authorized entity may define specific types of communications that are and/or are not allowed to occur via the gateway device 102. It can be appreciated that by controlling access with certificates 112, embodiments of the concepts and technologies disclosed herein can allow systemic and/or gateway-based control of content (i.e., control from the user device 114 and the gateway device 102) instead of merely relying on filtering to control content. Such gateway-based control of communications may be impossible for a device to circumvent as no connection can be maintained between the device and the gateway device 102 without the certificate 112 in some embodiments. It should be understood that this example embodiment is illustrative, and therefore should not be construed as being limiting in any way.

Furthermore, it can be appreciated that by having user-specific, device-specific, context-specific, location-specific, and/or time-specific certificates 112, embodiments of the concepts and technologies disclosed herein can enable different users to obtain different content at different times (as opposed to gateway-level or router-based filtering or other controls that may affect all users equally) at the connection-to-gateway level. It should be understood that this example embodiment is illustrative, and therefore should not be construed as being limiting in any way.

As such, it can be appreciated that the gateway device 102 can store configurations and/or settings that can define types of content for which certificates 112 may or may not be required; times of day during which certificates 112 may or may not be required; users or devices for whom certificates 112 may or may not be required; combinations thereof; or the like. As such, the gateway device 102 can examine the data being communicated, compare the data and the context of the data to the allowed and/or disallowed data and/or contexts to determine if the certificates 112 should be used. Because the gateway device 102 can determine that certificates 112 should (or should not) be used in additional and/or alternative manners, it should be understood that these example embodiments are illustrative, and therefore should not be construed as being limiting in any way.

If the gateway device 102 determines that certificates 112 should not be used for the communications, the communications can proceed without certificates 112. If the gateway device 102 determines that certificates 112 should be used, the gateway device can analyze the profile 118 associated with the user (or device) and the context of the communications to determine if the context of the communications (e.g., the content being obtained or sent) is allowed for the user associated with the communications (e.g., the user of the user device 114); as well as to determine time limitations (e.g., a time of day at which the communications are occurring, a time duration of the communications that will be allowed or will not be allowed, or the like) that should be imposed; content limitations (e.g., violent content, explicit content, or the like) that should be imposed, location limitations (e.g., on the premises 106, not on the premises 106, etc.) that should be imposed on the communications; application limits that should be imposed on the communications (e.g., applications that may or may not be used during the communications); combinations thereof; or the like. The gateway device 102 can use all of these determinations in defining the certificates 112 that are to be generated by the gateway device 102 for use in the data communications via the gateway device 102.

Figure 2:
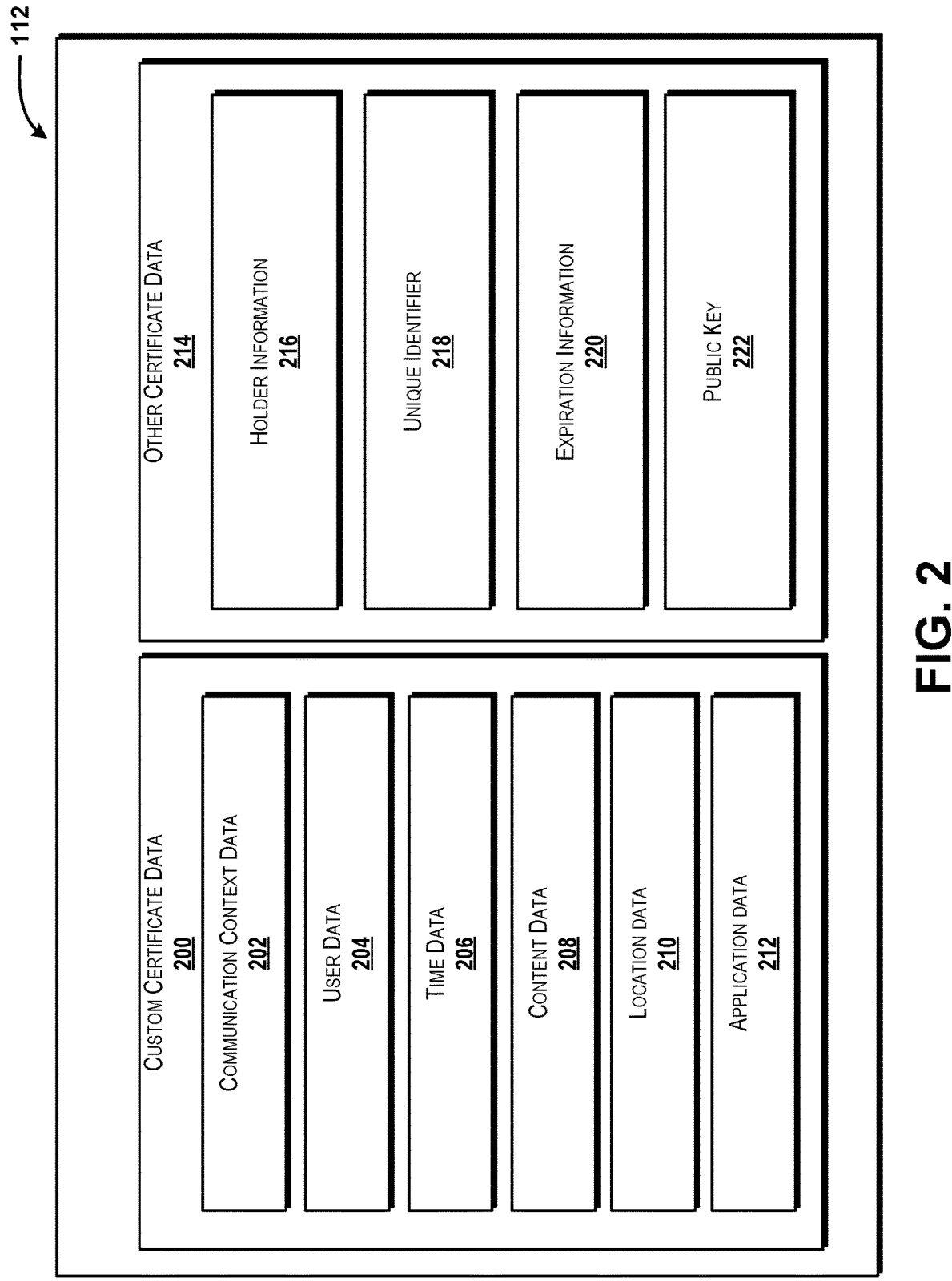
FIG. 2 is a line diagram that schematically illustrates a certificate used in various embodiments of the concepts and technologies disclosed herein.

Referring additionally to FIG. 2, the certificates 112 illustrated and described herein will be further described. In various example embodiments, the gateway device 102 can be configured to create certificates 112 with custom certificate data 200 that can define various limits on communications that are or are not allowed by the gateway device 102. For example, the custom certificate data 200 can include communication context data 202, which can define communication contexts that are or are not permitted for the communications. The communication contexts defined by the communication context data 202 in the certificate 112 can indicate, for example, that video is or is not permitted, that photos/images are or are not permitted, that social media messages are or are not permitted, that file transfers are or are not permitted, or the like. Because other communication contexts can be allowed or disallowed by the custom certificate data 200 in the certificate 112, it should be understood that these example embodiments are illustrative, and therefore should not be construed as being limiting in any way.

The gateway device 102 also can be configured to create the certificate 112 with custom certificate data 200 that can define users that are or are not permitted to engage in the communications that otherwise are defined by the certificate 112 (e.g., by the communication contexts mentioned immediately above). For example, the custom certificate data 200 can include user data 204, which can identify users, for example, by name, by login information, by device information (e.g., the device being used to connect), or the like. Because the users can be identified in additional and/or alternative manners, it should be understood that these example embodiments are illustrative, and therefore should not be construed as being limiting in any way.

The gateway device 102 also can be configured to create the certificate 112 with custom certificate data 200 that can define time limitations that are to be imposed on the communications that otherwise are defined by the certificate 112 (e.g., by the communication contexts and user information mentioned above). For example, the custom certificate data 200 can include time data 206, which can define time limitations, for example, one or more times of day at which the communications will be allowed and/or will be blocked; a data session or content time duration (e.g., a video length, a total screen time, or the like) for which the communications will be allowed or will not be allowed; days of the week, days of the month, days of the year, or the like on which the communications will be allowed or will not be allowed; combinations thereof, or the like. Because the time limitations can be defined in additional and/or alternative manners, it should be understood that these example embodiments are illustrative, and therefore should not be construed as being limiting in any way.

The gateway device 102 also can be configured to create the certificate 112 with custom certificate data 200 that can define content limitations that are to be imposed on the communications that otherwise are defined by the certificate 112 (e.g., by the communication contexts, user information, and/or time limitations mentioned above). For example, the custom certificate data 200 can include content data 208, which can define, for example, additional details about the content that is allowed as opposed to the communication contexts, which define the type of data communications that are allowed or blocked. Thus, for example, the content limitations can be used to define allowing or blocking of violent content (e.g., violent scenes in videos, or the like), blocking or allowing hate speech, blocking or allowing explicit or violent imagery, combinations thereof, or the like. Thus, the content limitations can be used to fine tune specific scenes, text, videos, files, or images that may be blocked or allowed to enable granular control over content consumption and/or communication. Because the content limitations can include additional and/or alternative content that is to be blocked or allowed, it should be understood that these example embodiments are illustrative, and therefore should not be construed as being limiting in any way.

The gateway device 102 also can be configured to create the certificate 112 with custom certificate data 200 that can define location limitations (e.g., geolocation limits) that are to be imposed on the communications that otherwise are defined by the certificate 112 (e.g., by the communication contexts, user information, time limitations, and/or content limitations mentioned above). For example, the custom certificate data 200 can include location data 210, which can define, for example, a geographic area within which communications will be allowed and/or will be blocked; a geographic area outside of which communications will be allowed and/or will be blocked; a proximity to the gateway device 102 and/or the premises 106 in which or outside of which the communications will be allowed or will not be blocked; combinations thereof; or the like. Because the location limitations can be defined in additional and/or alternative manners, it should be understood that these example embodiments are illustrative, and therefore should not be construed as being limiting in any way.

The gateway device 102 also can be configured to create the certificate 112 with custom certificate data 200 that can define application limitations that are to be imposed on the communications that otherwise are defined by the certificate 112 (e.g., by the communication contexts, user information, time limitations, content limitations, and/or location limitations mentioned above). For example, the custom certificate data 200 can include application data 212, which can define, for example, one or more applications that are allowed and/or are not allowed for use in association with the communications otherwise defined by the certificate 112; time or screen limits associated with permitted applications otherwise defined by the certificate 112; users of applications that are or are not allowed; combinations thereof; or the like. Because the application limits can be defined in additional and/or alternative manners, it should be understood that these example embodiments are illustrative, and therefore should not be construed as being limiting in any way.

Upon defining the various contours of the data included in the certificate 112, the gateway device 102 can create the certificate 112 (or certificates 112). The certificate 112 created by the gateway device 102 can include the custom certificate data 200 as illustrated and described above, as well as other certificate data 214 that can enable secure communications. Thus, it can be appreciated that the other certificate data 214 can include, for example, holder information 216 such as, for example, a name of a certificate holder (e.g., the gateway device 102, a device such as the user device 114, a user associated with the user device 114, or the like), a unique identifier 218 that can identify the certificate 112 uniquely (e.g., a serial number or the like), expiration information 220 that can define one or more expiration dates for the certificate 112, and a copy of a public key 222, which can be used to encrypt data sent using the certificates 112. The gateway device 102 can create the certificate 112 and optionally one or more copies of the certificate 112. The gateway device 102 can maintain one copy of the certificate 112 and can distribute another copy of the certificate 112 to the user device 114. A local communication channel 134 can be enabled by the certificates 112 in some embodiments. It should be understood that this example embodiment is illustrative, and therefore should not be construed as being limiting in any way.

The gateway device 102 also can be configured to relay secure communications using the certificates 112 in some embodiments. As noted above, the gateway device 102 can communicate with the user device 114 via a local communication channel 134. The gateway device 102 also can communicate with one or more of the resources 116 to establish a secure communication channel 124. In particular, the gateway device 102 can be configured to provide setup communications 126 to the resources 116 for establishing the secure communication channel 124 (e.g., a tunnel, VPN, or the like) between the resources 116 and the gateway device 102. As shown in FIG. 1, the session data 128 exchanged by the gateway device 102 and the resources 116 can be relayed by the gateway device 102 to the user device 114 via the local communication channel 134 in some embodiments. It should be understood that this example embodiment is illustrative, and therefore should not be construed as being limiting in any way.

The gateway device 102 also can be configured (e.g., by execution of the certificate management application 110) to monitor the communications and determine, at any time, that the certificates should be modified and/or revoked. In particular, the gateway device 102 can detect communications (e.g., occurring between the gateway device 102 and the user device 114 using the certificate 112 and/or between the gateway device 102 and the resource 116), and inspect the session data 128 associated with the communications and the profile 118 associated with the user device 114 that is involved in the communications. The gateway device 102 can determine, based on the session data 128 being exchanged and the profile 118, if the certificate 112 is to be modified and/or revoked. In some embodiments, the gateway device 102 can inspect the session data 128 using the session data analysis module 132 of the certificate management application 110, though this is not necessarily the case in all embodiments.

The analysis of the session data 128 can in some embodiments be performed to determine if the content being exchanged as the session data 128 complies with the requirements of the certificate 112. For example, if violent imagery is prohibited by the certificate 112, the gateway device 102 can enforce compliance with this requirement at the certificate level based on, for example, the analysis of the session data 128. For example, the session data analysis module 132 can periodically capture a screenshot of the imagery included in the session data 128 and analyze that data using the session data analysis module 132. If the session data analysis module 132 detects a violent image or imagery in the session data 128, the certificate management application 110 can be configured to immediately modify the certificate 112 (e.g., to exclude the data now being provided) and/or to immediately revoke the certificate 112, thereby immediately severing the connection between the user device 114 and the gateway device 102 via the local communication channel 134. As such, the content can be controlled immediately by managing the certificates 112 in some embodiments. It should be understood that this example embodiment is illustrative, and therefore should not be construed as being limiting in any way.

It can be appreciated that traditional certificates can be issued with an expiration date, and the certificates 112 issued herein can also include an expiration data. The custom certificate data 200, however, can include time data 206, which the gateway device 102 can be configured to modify in real-time to effectively pause the certificate 112 (e.g., to define a time frame during which the certificate 112 is not valid). For example, in the violent scene example above, if the violent imagery is detected, the gateway device 102 can be configured to modify the certificate 112 in real-time to set the current time as a start time for invalidity of the certificate 112, and when the gateway device 102 determines that the violent imagery has ended in the content, the gateway device 102 can again modify the certificate 112 in real-time to set the new current time as an end time for invalidity of the certificate 112. Thus, the certificate 112 can be modified to temporarily suspend its validity instead of revoking the certificate 112. It should be understood that this example embodiment is illustrative, and therefore should not be construed as being limiting in any way.

It therefore can be appreciated that the gateway device 102 can modify the certificates 112 in real-time to temporarily suspend the certificate 112 and/or to immediately revoke the certificate under other circumstances. Thus, the gateway device 102 can use the concepts and technologies disclosed herein to protect users from content in real-time (e.g., from violent content, explicit content, hate speech, or the like). It should be understood that this example embodiment is illustrative, and therefore should not be construed as being limiting in any way. If the gateway device 102 determines that the certificate 112 should be modified, the gateway device 102 can issue modifications to the certificates 112 to effect those changes.

From the perspective of the user device 114 or other device that may communicate via the gateway device 102, a custom application or module (e.g., in the case of the user device 114 shown in FIG. 1 that includes the certificate management module 122) can monitor communications with the gateway device 102. For example, during communications with a resource 116, the certificate management module 122 can monitor communications via the gateway device 102. If the user device 114 receives a revocation of the certificate 112 from the gateway device 102, the local communication channel 134 may disappear, so the user device 114 can immediately end the communications with the resource 116. It should be understood that this example embodiment is illustrative, and therefore should not be construed as being limiting in any way.

In some embodiments, the user device 114 can also detect receipt of a modification of the certificate 112 from the gateway device 102. In such a case, the user device 114 can immediately update the certificate 112 and begin monitoring communications in association with the modified certificate 112. Thus, the concepts and technologies disclosed herein can enable gateway-device-based and/or device-based management of certificates 112. It should be understood that this example embodiment is illustrative, and therefore should not be construed as being limiting in any way.

FIG. 1 illustrates one gateway device 102, one network 104, one user device 114, and four resources 116. It should be understood, however, that various implementations of the operating environment 100 can include one or more than one gateway device 102; one or more than one network 104; zero, one, or more than one user device 114; and/or one, two, three, or more than three resources 116. As such, the illustrated embodiment should be understood as being illustrative, and should not be construed as being limiting in any way.

Figure 3:
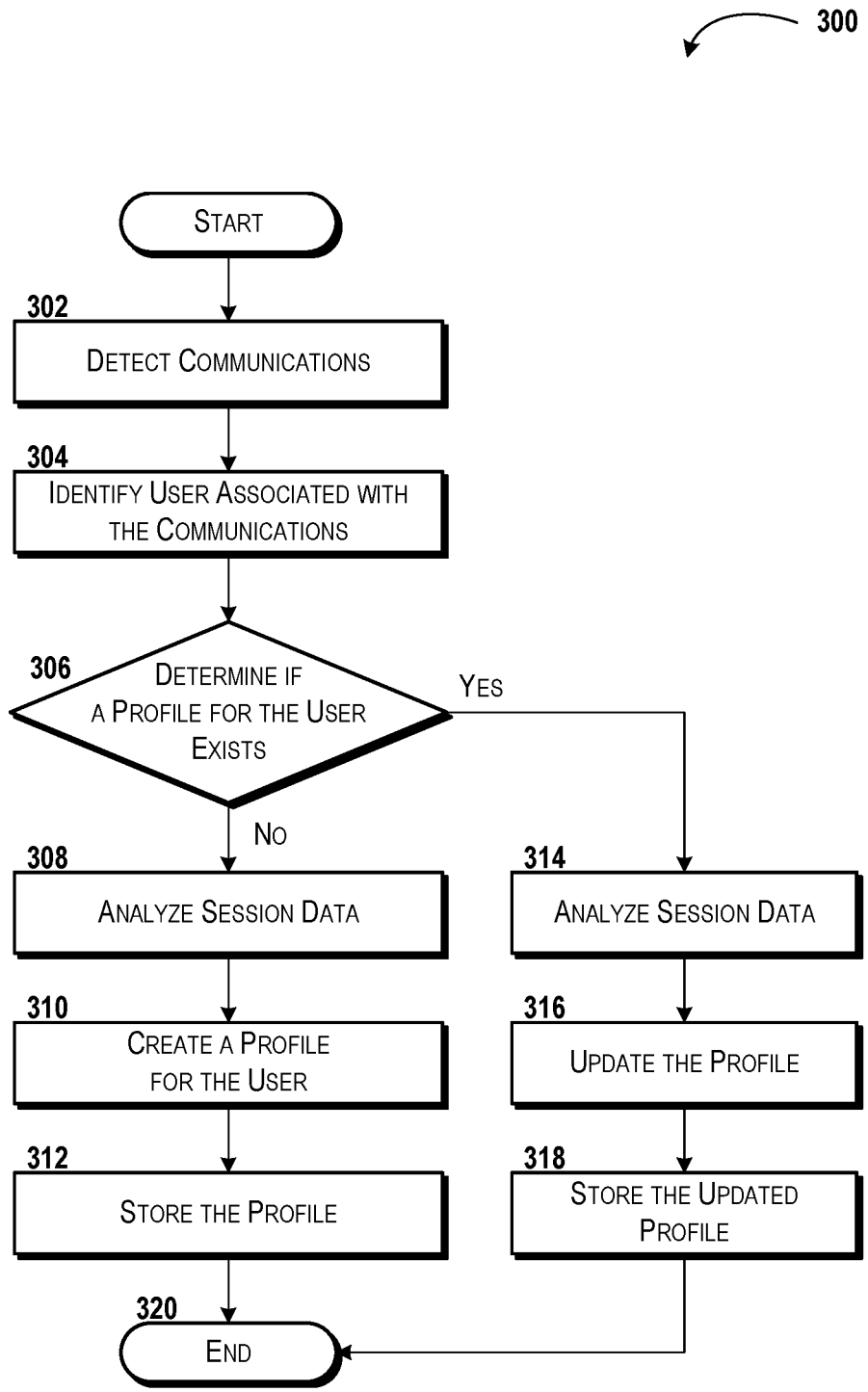
FIG. 3 is a flow diagram showing aspects of a method for creating a profile for use in gateway certificate management, according to an illustrative embodiment of the concepts and technologies described herein.

Turning now to FIG. 3, aspects of a method 300 for creating a profile 118 for use in gateway certificate management will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the gateway device 102 and/or the user device 114 to perform one or more operations and/or causing the processor to direct other components of the computing system or device to perform one or more of the operations.

For purposes of illustrating and describing the concepts of the present disclosure, the method 300 is described herein as being performed by the gateway device 102 via execution of one or more software modules such as, for example, the certificate management application 110. It should be understood that additional and/or alternative devices and/or network nodes can provide the functionality described herein via execution of one or more modules, applications, and/or other software including, but not limited to, the certificate management application 110. Thus, the illustrated embodiments are illustrative, and should not be viewed as being limiting in any way.

The method 300 begins at operation 302. At operation 302, the gateway device 102 can detect communications. The communications detected in operation 302 can include communications between a device connected to the gateway device 102 and thereby to the network 104 (e.g., the user device 114 shown in FIG. 1) and one or more resources 116 such as, for example, a web server, application server, file server, or other device or entity that does not connect to the network 104 via the gateway device 102. In various embodiments of the concepts and technologies disclosed herein, the communications detected in operation 302 therefore can correspond to communications between the user device 114 and the resource 116 via the gateway device 102. Because these communications can occur via the gateway device 102, the gateway device 102 can detect the communications directly in various embodiments. It should be understood that this example embodiment is illustrative, and therefore should not be construed as being limiting in any way.

From operation 302, the method 300 can proceed to operation 304. At operation 304, the gateway device 102 can identify a user associated with the communications detected in operation 302. Operation 304 can correspond to the gateway device 102 determining an identity associated with the user device 114 or other device that is communicating via the gateway device 102 as illustrated and described herein. According to various embodiments, the gateway device 102 can identify the user device 114 via media access control ("MAC") address information, an IP address associated with the user device 114, a login and/or name information associated with the user device 114, and/or other identifiers that may be known to the gateway device 102 via registering the user device 114 for communications inter alia the gateway device 102 as is generally understood. Because the user and/or the device can be identified in additional and/or alternative manners, it should be understood that these example embodiments are illustrative, and therefore should not be construed as being limiting in any way.

From operation 304, the method 300 can proceed to operation 306. At operation 306, the gateway device 102 can determine if a profile 118 for the user identified in operation 304 exists. Thus, in operation 306, the gateway device 102 can determine if a profile 118 for the user identified in operation 304 is stored at the gateway device 102. In some embodiments, the profiles 118 can be stored for multiple users and/or devices, and the gateway device 102 can search the profiles 118 in operation 306 to determine if a profile 118 associated with the user identified in operation 304 is stored. Because the profile 118 associated with a user and/or device can be identified in additional and/or alternative manners, it should be understood that this example embodiment is illustrative, and therefore should not be construed as being limiting in any way.

If the gateway device 102 determines, in operation 306, that the profile 118 for the user does not exist (e.g., that no profile 118 associated with the user identified in operation 304 is stored at the gateway device 102), the method 300 can proceed to operation 308. At operation 308, the gateway device 102 can analyze the session data 128 received in association with the communications detected in operation 302.

At operation 308, as explained herein, the gateway device 102 can analyze the session data 128 in various manners such as, for example, analyzing a file format (e.g., whether the session data 128 relates to images, video, audio, files, or the like); analyzing a source associated with the session data 128 (e.g., one or more of the resources 116 and/or whether the source is an authorized source); analyzing text in the session data 128 (e.g., by reading text, by using optical character recognition ("OCR") on screenshots, by using speech to text technology (e.g., for audio files), or the like); by analyzing imagery in the session data 128 (e.g., by generating screenshots and using artificial intelligence and/or machine learning to determine if violent or explicit content is included in the session data 128); combinations thereof; or the like.

The gateway device 102 also can perform other types of analysis on the session data 128 and/or conditions surrounding the transfer and/or exchange of the session data 128. For example, the gateway device 102 can determine a user and/or device (e.g., the user device 114) associated with the session data 128; a geographic location associated with the session data 128 (e.g., a geographic location at which the user device 114 is located when the session data 128 is created and/or received); an application or service used to send or receive the session data 128; time information such as a day, week, and/or time of day at which the session data 128 is created and/or received; and/or other contextual information associated with the data exchange. As such, in operation 308, it can be appreciated that the gateway device 102 can determine and/or capture various types of contextual information that can describe the circumstances associated with the exchange of the session data 128. Because the gateway device 102 can capture other types of information in the analysis of the session data 128 and/or capturing of contextual information, it should be understood that the above examples of information are illustrative and therefore should not be construed as being limiting in any way.

From operation 308, the method 300 can proceed to operation 310. At operation 310, the gateway device 102 can create a profile 118 for the user. The profile 118 created in operation 310 can include the various types of information captured and/or determined from the analysis of the session data 128 as explained herein. Thus, it can be appreciated that the profile 118 created in operation 310 can include data that describes the time at which data was sent or received by the user device 114, data that describes what application was used by the user device 114 to send or receive the data, data that describes a geographic location at which the user device 114 was located when sending or receiving the data, data that describes a user or other entity that was using the user device 114 when the data was sent or received, and/or other contextual information that can be used to describe the circumstances existing at the time the data was sent and/or received by the user device 114. Thus, it can be appreciated that the profile 118 can correspond to a model of behavior of the user device 114 and/or the user associated with the user device 114 in some embodiments. It should be understood that this example embodiment is illustrative, and therefore should not be construed as being limiting in any way.

From operation 310, the method 300 can proceed to operation 312. At operation 312, the gateway device 102 can store the profile 118. According to various embodiments of the concepts and technologies disclosed herein, the profile 118 can be stored in a data structure (e.g., a database, folder, or other data storage device and/or location) that can be located at the gateway device 102 and/or at other data storage locations. In some embodiments, the profiles 118 can be stored locally to allow the gateway device 102 to quickly retrieve and/or perform operations on the profiles 118. It should be understood that this example embodiment is illustrative, and therefore should not be construed as being limiting in any way.

If the gateway device 102 determines, in operation 306, that the profile 118 for the user exists (e.g., that the profile 118 associated with the user identified in operation 304 is stored at the gateway device 102), the method 300 can proceed to operation 314. At operation 314, the gateway device 102 can analyze the session data 128 received in association with the communications detected in operation 302. It can be appreciated that the functionality of the gateway device 102 in operation 314 can be substantially similar to the functionality illustrated and described herein with reference to operation 308.

Namely, in operation 314, the gateway device 102 can analyze the session data 128 to determine, for example, a file format (e.g., whether the session data 128 relates to images, video, audio, files, or the like); a source associated with the session data 128 (e.g., one or more of the resources 116 and/or whether the source is an authorized source); an application used to generate and/or receive the session data 128; text or scripts associated with the session data 128 (e.g., by analyzing text in the session data 128 by reading text, by using OCR on screenshots, by using speech to text technology on audio files, or the like); by analyzing imagery in the session data 128 (e.g., by generating screenshots and using artificial intelligence and/or machine learning to determine if violent or explicit content is included in the session data 128); combinations thereof; or the like.

The gateway device 102 also can capture other information relating to and/or contextually related to the session data 128 and/or conditions surrounding the transfer and/or exchange of the session data 128 such as, for example, a user and/or device (e.g., the user device 114) associated with the session data 128; a geographic location associated with the session data 128 (e.g., a geographic location at which the user device 114 is located when the session data 128 is created and/or received); an application or service used to send or receive the session data 128; time information such as a day, week, and/or time of day at which the session data 128 is created and/or received; and/or other contextual information associated with the data exchange. As such, in operation 314, it can be appreciated that the gateway device 102 can determine and/or capture various types of contextual information that can describe the circumstances associated with the exchange of the session data 128. Because the gateway device 102 can capture other types of information in the analysis of the session data 128 and/or capturing of contextual information, it should be understood that the above examples of information are illustrative and therefore should not be construed as being limiting in any way.

From operation 314, the method 300 can proceed to operation 316. At operation 316, the gateway device 102 can update a profile 118 associated with the user. As such, it can be appreciated that the gateway device 102 can be configured to retrieve the profile 118 associated with the user identified in operation 304 when the determination is made in operation 306 that the profile 118 exists. This can occur at operation 306, operation 316, or at other times. In any event, the gateway device can update the profile 118 to include various types of information captured and/or determined from the analysis of the session data 128. Thus, it can be appreciated that the updated version of the profile 118 can include data that describes the time at which data was sent or received by the user device 114, data that describes what application was used by the user device 114 to send or receive the data, data that describes a geographic location at which the user device 114 was located when sending or receiving the data, data that describes a user or other entity that was using the user device 114 when the data was sent or received, and/or other contextual information that can be used to describe the circumstances existing at the time the data was sent and/or received by the user device 114. Thus, it can be appreciated that the updated version of the profile 118 can be based on at least two instances of behavior of the user device 114, and therefore can more accurately model (relative to the previous version of the profile 118 that was based on as few as one instance of behavior) behavior of the user device 114 in some embodiments. It should be understood that this example embodiment is illustrative, and therefore should not be construed as being limiting in any way.

From operation 316, the method 300 can proceed to operation 318. At operation 318, the gateway device 102 can store the updated version of the profile 118 in a data repository, data store, database, memory, or other data storage location or data structure at the gateway device 102 and/or at other data storage locations. It should be understood that this example embodiment is illustrative, and therefore should not be construed as being limiting in any way.

From operation 318, the method 300 can proceed to operation 320. The method 300 can also proceed to operation 320 from operation 312. The method 300 can end at operation 320.

Figure 4:
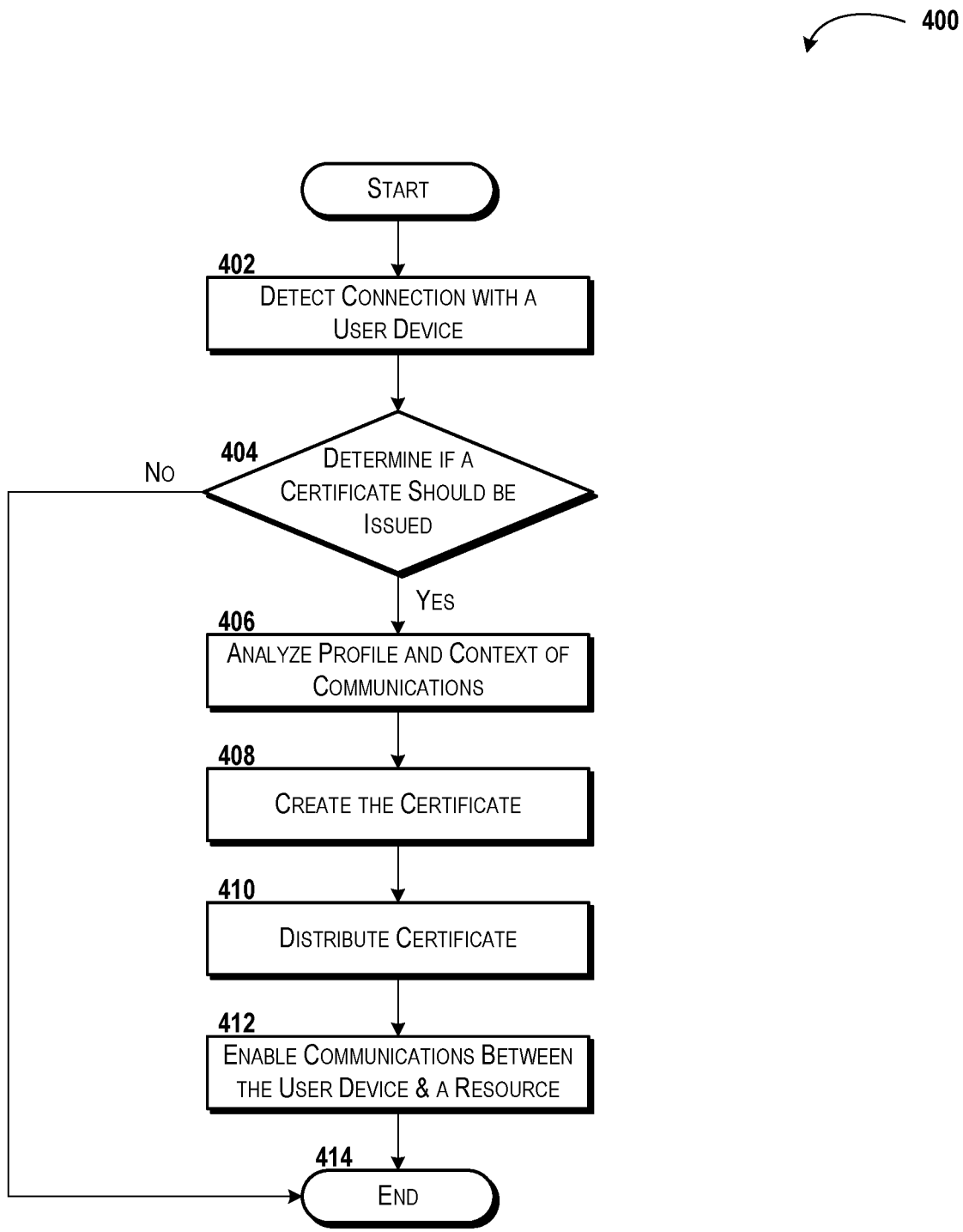
FIG. 4 is a flow diagram showing aspects of a method for creating certificates for use in gateway certificate management, according to an illustrative embodiment of the concepts and technologies described herein.

Turning now to FIG. 4, aspects of a method 400 for creating certificates 112 for use in gateway certificate management will be described in detail, according to an illustrative embodiment. For purposes of illustrating and describing the concepts of the present disclosure, the method 400 is described herein as being performed by the gateway device 102 via execution of one or more software modules such as, for example, the certificate management application 110. It should be understood that additional and/or alternative devices and/or network nodes can provide the functionality described herein via execution of one or more modules, applications, and/or other software including, but not limited to, the certificate management application 110. Thus, the illustrated embodiments are illustrative, and should not be viewed as being limiting in any way.

The method 400 begins at operation 402. At operation 402, the gateway device 102 can detect a connection with a device such as the user device 114. The connection detected in operation 402 can include an initial request or other communications between a device connected to the gateway device 102 (e.g., the user device 114) and the gateway device 102. For example, the user device 114 may be requesting a connection (via the gateway device 102) to a web server, an application server, a file server, a web site, or other devices or entities that may be accessed (via the gateway device 102 and the network 104). It can be appreciated that prior to operation 402, the user device 114 may have connected to the gateway device 102 (e.g., via a WiFi connection or the like) and may have requested access to a resource 116 (via the gateway device 102). In various embodiments of the concepts and technologies disclosed herein, the communications detected in operation 402 therefore can correspond to an attempt to establish communications between the user device 114 and the resource 116 via the gateway device 102. It should be understood that this example embodiment is illustrative, and therefore should not be construed as being limiting in any way.

From operation 402, the method 400 can proceed to operation 404. At operation 404, the gateway device 102 can determine if a certificate 112 should be issued for the connection requested in operation 402. In particular, the gateway device 102 can determine, based on the connection detected in operation 402, if the requested access should be granted. For example, the gateway device 102 can be configured to analyze a profile 118 and/or one or more settings or configurations defined for a user or user device 114 (as explained herein) to determine if the user or device that is requesting the connection is authorized to do so based on the profile 118 and/or the configurations and/or settings. It should be understood that in various embodiments of the concepts and technologies disclosed herein, the profile 118 can include the configurations, settings, and/or limits that may be defined for a particular user and/or device, and as such, the gateway device 102 may only perform an analysis of the profile 118 to determine if a certificate 112 should be issued (e.g., to allow the connection being requested by the user device 114). Because the determination as to whether or not a connection should be granted (and a certificate 112 issued) can be performed in additional and/or alternative manners, it should be understood that these example embodiments are illustrative, and therefore should not be construed as being limiting in any way.

If the gateway device 102 determines, in operation 404, that the certificate 112 should be issued for the connection requested in operation 402, the method 400 can proceed to operation 406. At operation 406, the gateway device 102 can analyze the profile 118 and the context of the communications requested by way of the connection requested in operation 402. In particular, the gateway device 102 can be configured to analyze the context of the communications to determine the type of communication being requested (e.g., if the communications involve sending or receiving video, sending or receiving images, sending or receiving audio, sending or receiving files, or the like); a time of day associated with the communication being requested (e.g., what day of the week, month, or year as well as the time of day during which the communications are being requested); an expected duration for the communications being requested; a user and/or device associated with the communications being requested; an application that is to be used in association with the communication being requested; geographic locations associated with the communications; and the like. Because additional and/or alternative context may be determined from the context of the communications being requested, it should be understood that these example embodiments are illustrative, and therefore should not be construed as being limiting in any way.

The gateway device 102 can also be configured to analyze the profile 118 associated with the user or device being used for the communications to determine any limits on the types of communication allowed for the user and/or device (e.g., if communications involving sending or receiving video, sending or receiving images, sending or receiving audio, sending or receiving files, or the like are allowed); time limitations associated with the user and/or device (e.g., what day of the week, month, or year as well as the time of day the user or device can engage in communications); what durations of communications are allowed for the user and/or device; what users and/or devices can be enabled for the user or device; an application that is to be used in association with the communication being requested; geographic locations associated with the communications; and the like. Because additional and/or alternative context may be determined from the context of the communications being requested, it should be understood that these example embodiments are illustrative, and therefore should not be construed as being limiting in any way.

From operation 406, the method 400 can proceed to operation 408. At operation 408, the gateway device 102 can generate the certificate 112. In operation 408, the gateway device 102 can determine, based on the analysis of operation 406, any communication context limitations for the communications to be enabled by the certificate 112; any user limitations for the communications to be enabled by the certificate 112; any time limitations for the communications to be enabled by the certificate 112; any content limitations for the communications to be enabled by the certificate 112; any context limitations for the communications to be enabled by the certificate 112; any location limitations for the communications to be enabled by the certificate 112; any application limitations for the communications to be enabled by the certificate 112; and/or any other limitations that may be defined for the communications to be enabled by the certificate 112.

The gateway device 102 also can be configured to generate, in operation 408, the custom certificate data 200 including, but not limited to, the communication context data 202, the user data 204, the time data 206, the content data 208, the location data 210, the application data 212, and the like. The gateway device 102 also can determine the other certificate data 214 such as the holder information 216, the unique identifier 218, the expiration information 220, and the public key 222. The gateway device 102 can create and/or issue the certificate 112, where the certificate issued in operation 408 can include at least the custom certificate data 200 and the other certificate data 214. It should be understood that this example embodiment is illustrative, and therefore should not be construed as being limiting in any way.

From operation 408, the method 400 can proceed to operation 410. At operation 410, the gateway device 102 can distribute the certificate 112 created in operation 408 (or a copy thereof) to the user device 114. The gateway device 102 also can retain a copy of the certificate 112, as is generally understood.

From operation 410, the method 400 can proceed to operation 412. At operation 412, the gateway device 102 can enable communications between the user device 114 and a resource 116 (with which the communications were originally requested by the user device 114). Thus, the gateway device 102 can be configured to establish a connection with the user device 114 using the certificate 112 generated in operation 410. Thus, the gateway device 102 can establish a local communication channel 134 with the user device 114. It can be appreciated that the local communication channel 134 can be a secure and/or encrypted channel by way of establishing the channel using the certificate 112.

Additionally, the gateway device 102 can establish the secure communication channel 124 with the resource 116 in operation 412, though it should be understood that other types of communication channels between the gateway device 102 and the resources 116 are possible and are contemplated (e.g., the gateway device 102 and the resource 116 may communicate via non-secured communication channels in some instances). At any rate, once the local communication channel 134 and the secure communication channel 124 (or other channel) are established, the gateway device 102 can enable a tunnel or VPN or other connection between the user device 114 and the resource 116 to enable communication between the user device 114 and the resource 116 via the gateway device 102. It should be understood that this example embodiment is illustrative, and therefore should not be construed as being limiting in any way.

From operation 412, the method 400 can proceed to operation 414. The method 400 also can proceed to operation 414 from operation 404 if the gateway device 102 determines, in operation 404, that the certificate 112 should not be issued for the connection requested in operation 402. The method 400 can end at operation 414. Thus, it can be appreciated that if the gateway device 102 determines, in operation 404, that the certificate 112 should not be issued for the connection requested in operation 402, the method 400 can effectively end and the connection detected in operation 402 can be terminated without granting the access requested in some embodiments. It should be understood that this example embodiment is illustrative, and therefore should not be construed as being limiting in any way.

Figure 5:
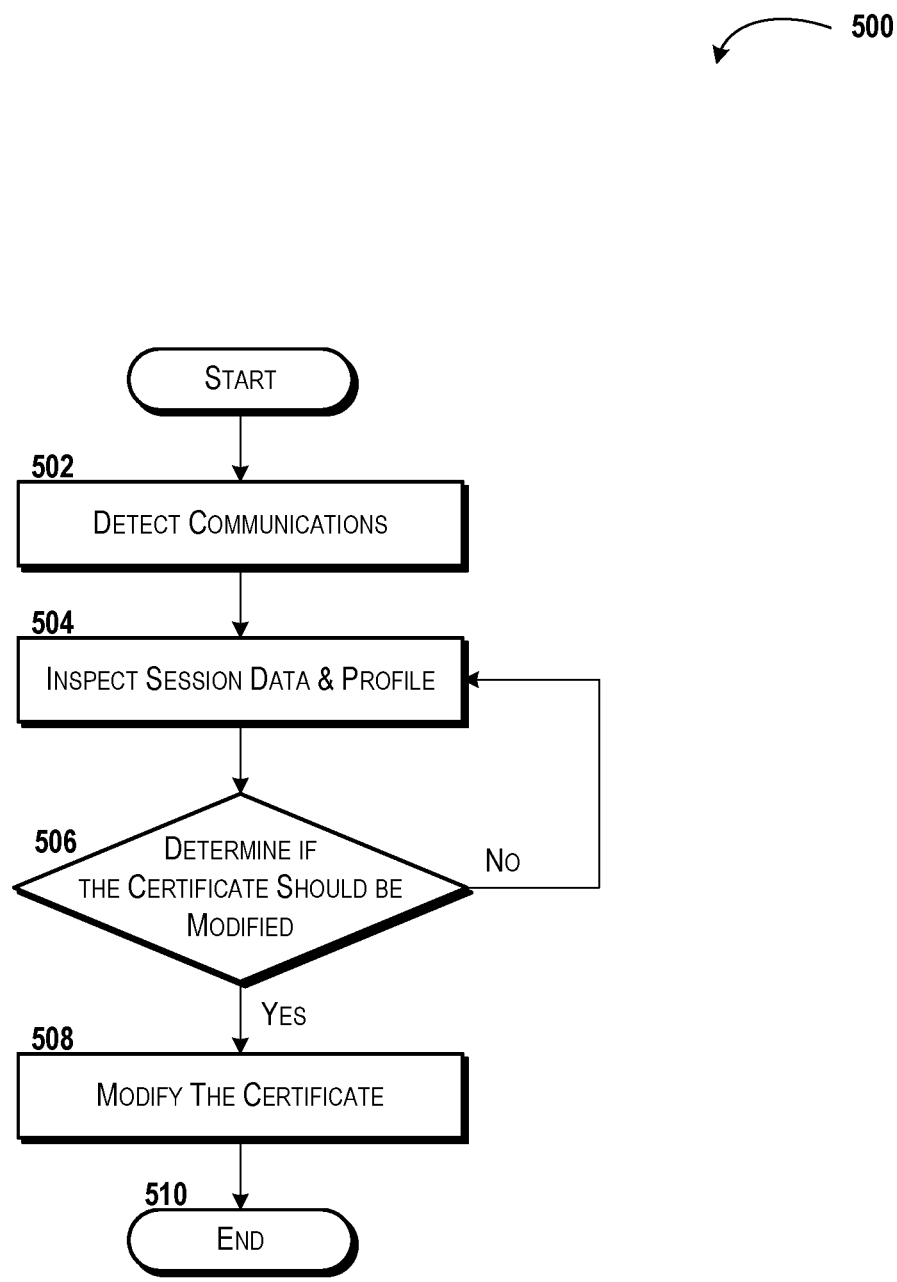
FIG. 5 is a flow diagram showing aspects of a method for modifying certificates in real-time to provide gateway certificate management, according to an illustrative embodiment of the concepts and technologies described herein.

Turning now to FIG. 5, aspects of a method 500 for modifying certificates 112 in real-time to provide gateway certificate management will be described in detail, according to an illustrative embodiment. For purposes of illustrating and describing the concepts of the present disclosure, the method 500 is described herein as being performed by the gateway device 102 via execution of one or more software modules such as, for example, the certificate management application 110. It should be understood that additional and/or alternative devices and/or network nodes can provide the functionality described herein via execution of one or more modules, applications, and/or other software including, but not limited to, the certificate management application 110. Thus, the illustrated embodiments are illustrative, and should not be viewed as being limiting in any way.

The method 500 begins at operation 502. At operation 502, the gateway device 102 can detect communications. The communications detected in operation 502 can include communications between a device connected to the gateway device 102 and thereby to the network 104 (e.g., the user device 114 shown in FIG. 1) and one or more resources 116 such as, for example, a web server, application server, file server, or other device or entity that does not connect to the network 104 via the gateway device 102. As can be appreciated in light of the above description, the communications detected in operation 502 can include the exchange of the session data 128 between the user device 114 and the resource 116 (e.g., between the user device 114 and the gateway device 102 via the local communication channel 134 and between the gateway device 102 and the resource 116 via the secure communication channel 124 and/or other functionality such as tunnels, VPNs, or the like). As such, it can be appreciated that in various embodiments of the concepts and technologies disclosed herein, the communications detected in operation 502 therefore can correspond to communications between the user device 114 and the resource 116 via the gateway device 102. Because these communications can occur via the gateway device 102, the gateway device 102 can detect the communications directly in various embodiments. It should be understood that this example embodiment is illustrative, and therefore should not be construed as being limiting in any way.

From operation 502, the method 500 can proceed to operation 504. At operation 504, the gateway device 102 can inspect the session data 128 (detected in operation 502) and the profile 118 associated with the user and/or device (e.g., the user device 114). In operation 504, the gateway device 102 can be configured to analyze the context and/or content of the communications to determine the type of communication being conducted (e.g., sending or receiving video, sending or receiving images, sending or receiving audio, sending or receiving files, or the like); a time of day associated with the communication being conducted (e.g., what day of the week, month, or year as well as the time of day during which the communications are occurring); a duration of the communications being conducted; a user and/or device associated with the communications being conducted; an application that is to be used in association with the communications being conducted; geographic locations associated with the communications; and the like.

The gateway device 102 also can inspect the session data 128 to determine if any prohibited content is being exchanged. For example, a user or other entity may prohibit violent imagery or videos, so the gateway device 102 can be configured (e.g., via the session data analysis module 132) to analyze the session data 128 to detect violent imagery in the session data 128. Because additional and/or alternative context may be determined from the context of the communications being requested, and because the gateway device 102 can examine the session data 128 in additional and/or alternative manners as illustrated and described herein, it should be understood that these example embodiments are illustrative, and therefore should not be construed as being limiting in any way.

The gateway device 102 can also be configured to analyze the profile 118 associated with the user or device being used for the communications to determine the type any limits of the types of communication allowed for the user and/or device (e.g., if communications involving sending or receiving video, sending or receiving images, sending or receiving audio, sending or receiving files, or the like are allowed); time limitations associated with the user and/or device (e.g., what day of the week, month, or year as well as the time of day can the user or device engage in communications); what durations of communications are allowed for the user and/or device; what users and/or devices can be enabled for the user or device; an application that is to be used in association with the communication being requested; geographic locations associated with the communications; specific content limitations (e.g., violent imagery, explicit imagery, hate speech, or the like), combinations thereof, or the like. Because additional and/or alternative context may be determined from the context of the communications being requested, it should be understood that these example embodiments are illustrative, and therefore should not be construed as being limiting in any way.

From operation 504, the method 500 can proceed to operation 506. At operation 506, the gateway device 102 can determine if the certificate 112 (that is being used to enable the communications between the user device 114 and the gateway device 102) should be modified (e.g., changed, revoked, or the like). In operation 506, the gateway device 102 can determine, based on the analysis of operation 504, if any communication context limitations for the communications enabled by the certificate 112 have been exceeded; any user limitations for the communications enabled by the certificate 112 have been exceeded; any time limitations for the communications enabled by the certificate 112 have been exceeded; any content limitations for the communications enabled by the certificate 112 have been exceeded; any context limitations for the communications enabled by the certificate 112 have been exceeded; any location limitations for the communications enabled by the certificate 112 have been exceeded; any application limitations for the communications enabled by the certificate 112 have been exceeded; and/or any other limitations that may be defined for the communications enabled by the certificate 112 have been exceeded. Thus, the gateway device 102 can determine, in operation 506, if the content being exchanged is outside of the limits originally defined for the certificate 112.

The gateway device 102 also can be configured to determine, in operation 506, if any of the custom certificate data 200 should be modified to change any limits or the like. For example, the gateway device 102 can determine, in operation 506, if the communication context data 202, the user data 204, the time data 206, the content data 208, the location data 210, or the application data 212 should be modified to determine if the certificate 112 should be modified. It should be understood that this example embodiment is illustrative, and therefore should not be construed as being limiting in any way.

If the gateway device 102 determines, in operation 506, that the certificate should not be modified, the flow of the method 500 can return to operation 504. Thus, it can be appreciated that flow of the method 500 can repeat operations 504-506 until the gateway device 102 determines, in any iteration of operation 506, that the certificate 112 should be modified (or until the certificate 112 is revoked, expires, or the communications associated with the certificate 112 end). It should be understood that this example embodiment is illustrative, and therefore should not be construed as being limiting in any way.

If the gateway device 102 determines, in operation 506, that the certificate should be modified, the method 500 can proceed to operation 508. At operation 508, the gateway device 102 can modify the certificate 112. It can be appreciated that because the gateway device 102 holds a copy of the certificate and uses it to communicate with the user device 114 via the local communication channel 134, revocation of the certificate 112 can be easily accomplished by the gateway device 102 by simply deleting or revoking the certificate 112 stored at the gateway device 102.

Embodiments of the concepts and technologies disclosed herein, however, also support real-time editing of the certificate 112 at the user device 114 at the direction of the gateway device 102 to make real-time changes to the certificate 112 without requiring revocation and/or issuance of a new certificate. Thus, in operation 508, the gateway device 102 can determine if any of the custom certificate data 200 should be modified. If so, the gateway device 102 can modify the certificate 112 by updating the communication context data 202, the user data 204, the time data 206, the content data 208, the location data 210, or the application data 212. The gateway device 102 can also be configured to provide a copy of the updated certificate 112 to the user device 114 and/or to send a modification (instructions for modifying the certificate 112) to the user device 114, which can implement the modification via execution of the certificate management module 122. It should be understood that this example embodiment is illustrative, and therefore should not be construed as being limiting in any way.

In some embodiments, as noted above, the modifications can effectively temporarily suspend validity of the certificate 112. For example, the gateway device 102 can generate time data that will invalidate the certificate 112 for a time period and thereby block content for a determined amount of time. Other changes can be made that will affect which applications can be used by the user device 114, what content can be obtained and/or sent by the user device 114, at what locations communications can occur via the user device 114, or the like. Thus, it can be appreciated that the certificates 112 can be modified in real-time according to various embodiments of the concepts and technologies disclosed herein. It should be understood that this example embodiment is illustrative, and therefore should not be construed as being limiting in any way.

From operation 508, the method 500 can proceed to operation 510. The method 500 can end at operation 510.

Figure 6:
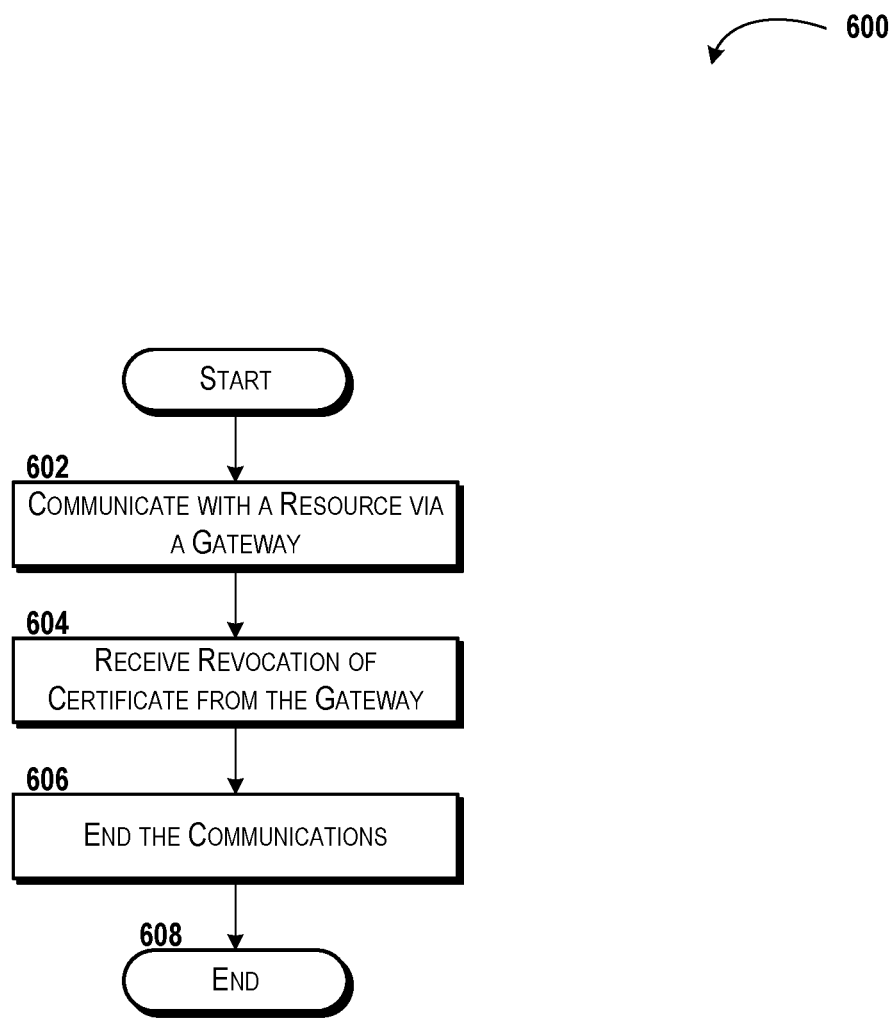
FIG. 6 is a flow diagram showing aspects of a method for modifying certificates in real-time to provide gateway certificate management, according to another illustrative embodiment of the concepts and technologies described herein.

Turning now to FIG. 6, aspects of a method 600 for modifying certificates 112 in real-time to provide gateway certificate management will be described in detail, according to an illustrative embodiment. For purposes of illustrating and describing the concepts of the present disclosure, the method 600 is described herein as being performed by the gateway device 102 via execution of one or more software modules such as, for example, the certificate management application 110. It should be understood that additional and/or alternative devices and/or network nodes can provide the functionality described herein via execution of one or more modules, applications, and/or other software including, but not limited to, the certificate management application 110. Thus, the illustrated embodiments are illustrative, and should not be viewed as being limiting in any way.

The method 600 begins at operation 602. At operation 602, the user device 114 can communicate with a resource 116 via the gateway device 102. As explained herein, the user device 114 can communicate with the gateway device 102 via a local communication channel 134, and the gateway device 102 can communicate with the resource 116 via a secure communication channel 124 in some embodiments. As such, it can be appreciated that the user device 114 can communicate with the resource 116 via the gateway device 102. It should be understood that this example embodiment is illustrative, and therefore should not be construed as being limiting in any way.

From operation 602, the method 600 can proceed to operation 604. At operation 604, the user device 114 can receive a revocation of the certificate 112 from the gateway device 102. It can be appreciated that in some embodiments, the revocation of the certificate 112 at the user device 114 can be automatic by detecting a severing of the local communication channel 134. In some other embodiments, the gateway device 102 can send an instruction to terminate the connection and/or that the certificate 112 has been revoked. In any event, the user device 114 can determine that the certificate 112 has been revoked in operation 604.

From operation 604, the method 600 can proceed to operation 606. At operation 606, the user device 114 can end the communications with the gateway device 102 using the certificate 112. Thus, in operation 606, the user device 114 can terminate communications with the gateway device 102 via the local communication channel 134, and the communications with the resource 116 therefore can be terminated automatically. It should be understood that this example embodiment is illustrative, and therefore should not be construed as being limiting in any way.

From operation 606, the method 600 can proceed to operation 608. The method 600 can end at operation 608.

Figure 7:
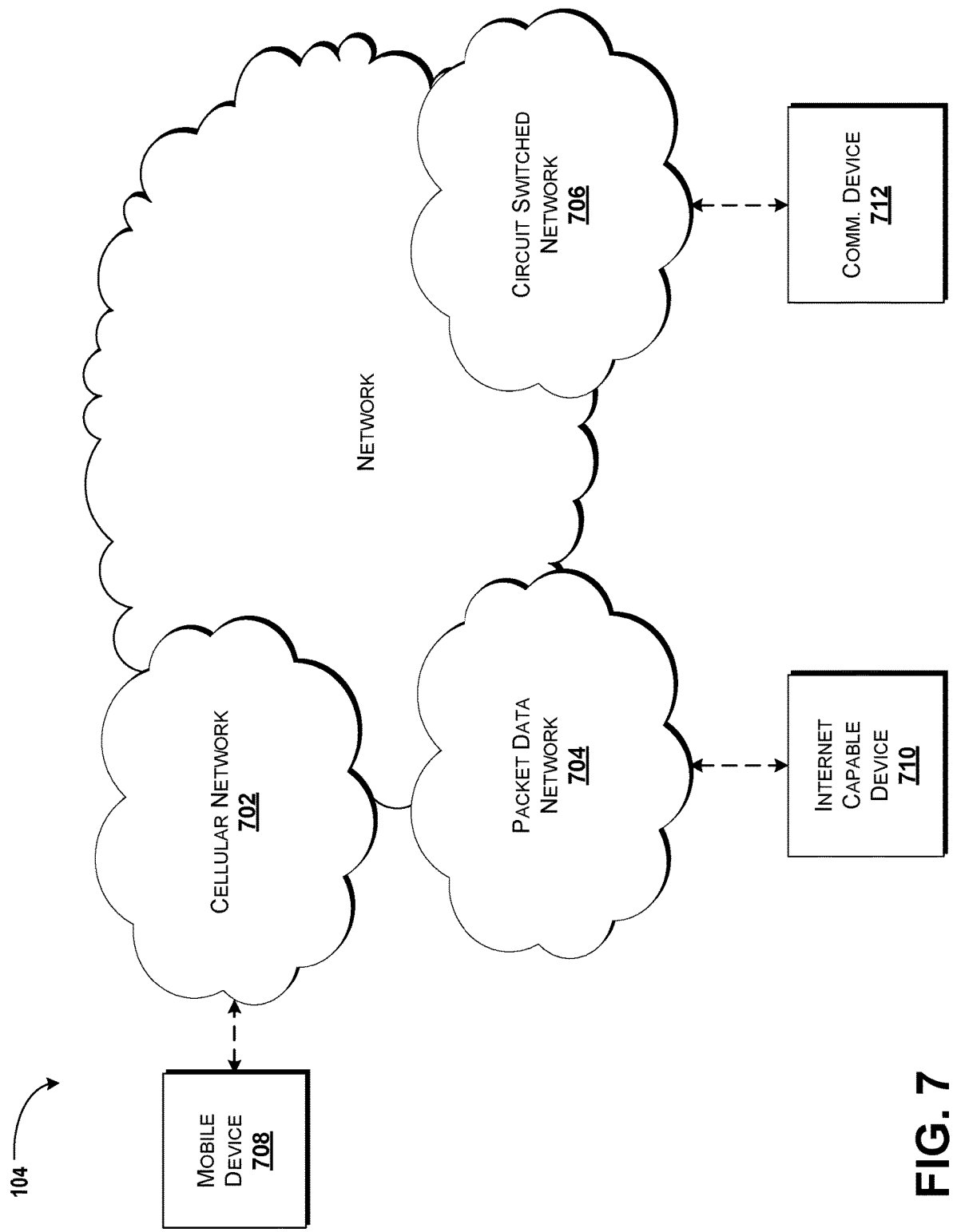
FIG. 7 schematically illustrates a network, according to an illustrative embodiment of the concepts and technologies described herein.

Turning now to FIG. 7, additional details of the network 104 are illustrated, according to an illustrative embodiment. The network 104 includes a cellular network 702, a packet data network 704, for example, the Internet, and a circuit switched network 706, for example, a publicly switched telephone network ("PSTN"). The cellular network 702 includes various components such as, but not limited to, base transceiver stations ("BTSs"), Node-B's or e-Node-B's ("eNBs"), gNodeBs ("gNBs"), or the like; base station controllers ("BSCs") radio network controllers ("RNCs"), or the like; an evolved packet core ("EPC"); mobile switching centers ("MSCs" or "MSSs"); session management functions ("SMFs); mobile management entities ("MMEs"); access and mobility management functions ("AMFs); authentication server functions ("AUSFs"), network slice selection functions ("NSSFs); network exposure functions ("NEFs"); session management functions ("SMFs"); policy control functions ("PCFs"); and various other functions in the user and control planes such as, for example, user plane functions ("UPFs), application functions ("AFs"), NF repository functions ("NRFs"), and the like; short message service centers ("SMSCs"); multimedia messaging service centers ("MMSCs"); home location registers ("HLRs"); home subscriber servers ("HSSs"); visitor location registers ("VLRs"); charging platforms; billing platforms; voicemail platforms; GPRS core network components; links to data networks ("DNs") and/or other operator services, third party services, and/or the Internet; location service nodes, an IP Multimedia Subsystem ("IMS"); and the like. Of course, the cellular network 702 also can include various interfaces between various components, as is generally understood. The cellular network 702 also includes radios and nodes for receiving and transmitting voice, data, and combinations thereof to and from radio transceivers, networks, the packet data network 704, and the circuit switched network 706.

A mobile communications device 708, such as, for example, a cellular telephone, a user equipment, a mobile terminal, a PDA, a laptop computer, a handheld computer, and combinations thereof, can be operatively connected to the cellular network 702. The cellular network 702 can be configured as a 2G GSM network and can provide data communications via GPRS and/or EDGE. Additionally, or alternatively, the cellular network 702 can be configured as a 3G UMTS network and can provide data communications via the HSPA protocol family, for example, HSDPA, EUL (also referred to as HSUPA), and HSPA+. The cellular network 702 also is compatible with 4G mobile communications standards, 5G mobile communications standards, 6G mobile communication standards, other mobile communications standards, and evolved and future mobile communications standards.

The packet data network 704 includes various devices, for example, servers, computers, databases, and other devices in communication with one another, as is generally known. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a plain old telephone system (POTS). The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 710, for example, a PC, a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710. In the specification, the network 104 is used to refer broadly to any combination of the networks 702, 704, 706. It should be appreciated that substantially all of the functionality described with reference to the network 104 can be performed by the cellular network 702, the packet data network 704, and/or the circuit switched network 706, alone or in combination with other networks, network elements, and the like.

Figure 8:
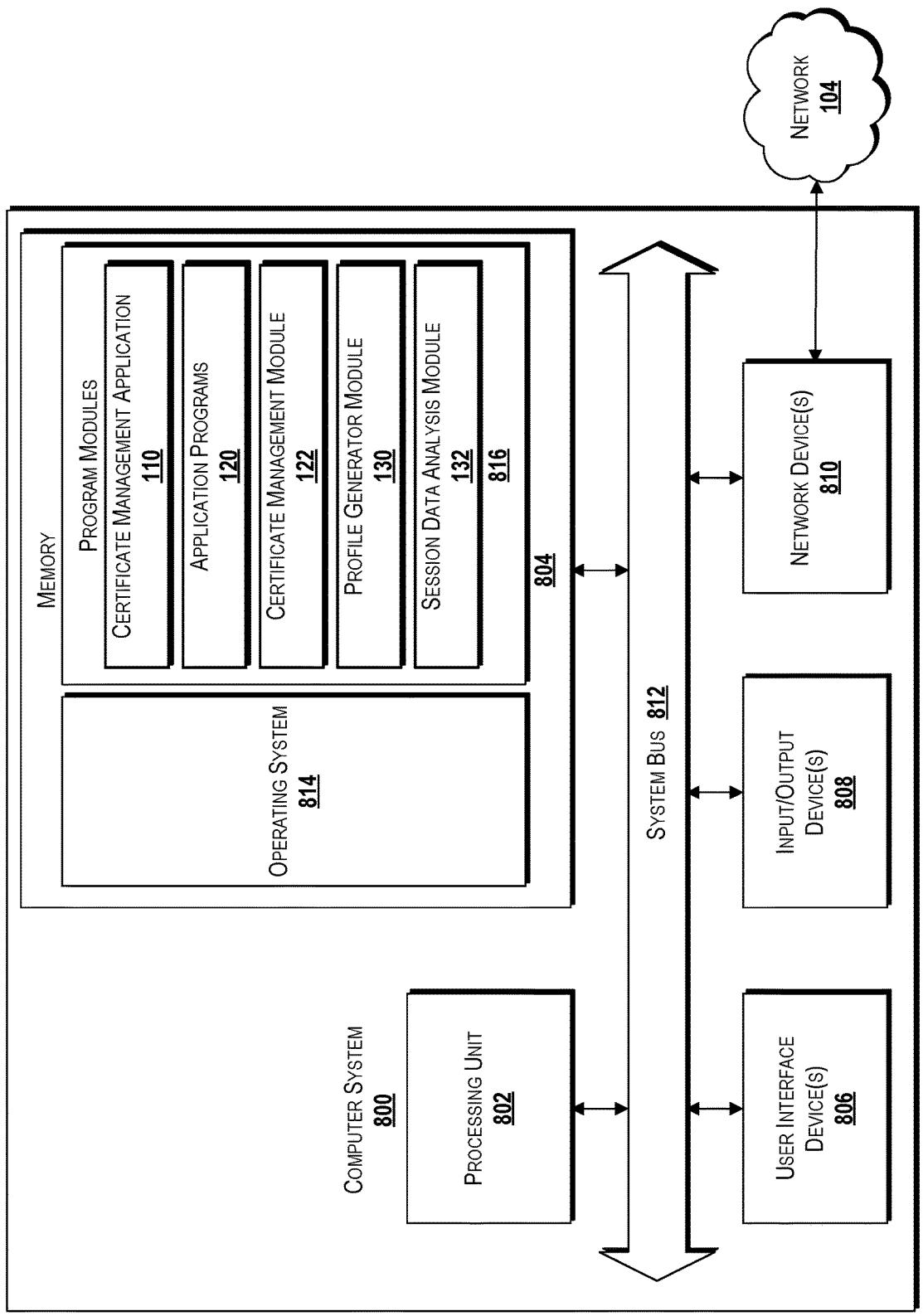
FIG. 8 is a block diagram illustrating an example computer system configured to provide gateway certificate management, according to some illustrative embodiments of the concepts and technologies described herein.

FIG. 8 is a block diagram illustrating a computer system 800 configured to provide the functionality described herein for gateway certificate management, in accordance with various embodiments of the concepts and technologies disclosed herein. The computer system 800 includes a processing unit 802, a memory 804, one or more user interface devices 806, one or more input/output ("I/O") devices 808, and one or more network devices 810, each of which is operatively connected to a system bus 812. The system bus 812 can enable bi-directional communication between the processing unit 802, the memory 804, the user interface devices 806, the I/O devices 808, and the network devices 810.

The processing unit 802 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 804 communicates with the processing unit 802 via the system bus 812. In some embodiments, the memory 804 is operatively connected to a memory controller (not shown) that enables communication with the processing unit 802 via the system bus 812. The memory 804 includes an operating system 814 and one or more program modules 816. The operating system 814 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 816 may include various software and/or program modules described herein. In some embodiments, for example, the program modules 816 include the certificate management application 110, the application programs 120, the certificate management module 122, the profile generator module 130, the session data analysis module 132, or the like. These and/or other programs can be embodied in computer-readable media containing instructions that, when executed by the processing unit 802, perform one or more of the methods 300, 400, 500, and 600 described in detail above with respect to FIGS. 3-6 and/or other functionality as illustrated and described herein. It can be appreciated that, at least by virtue of the instructions embodying the methods 300, 400, 500, and 600 and/or other functionality illustrated and described herein being stored in the memory 804 and/or accessed and/or executed by the processing unit 802, the computer system 800 is a special-purpose computing system that can facilitate providing the functionality illustrated and described herein. According to embodiments, the program modules 816 may be embodied in hardware, software, firmware, or any combination thereof. Although not shown in FIG. 8, it should be understood that the memory 804 also can be configured to store the certificates 112, the profiles 118, the setup communications 126, the session data 128, and/or other data, if desired.

By way of example, and not limitation, computer-readable media may include any available computer storage media or communication media that can be accessed by the computer system 800. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 800. In the claims, the phrase "computer storage medium" and variations thereof does not include waves or signals per se and/or communication media.

The user interface devices 806 may include one or more devices with which a user accesses the computer system 800. The user interface devices 806 may include, but are not limited to, computers, servers, personal digital assistants, cellular phones, or any suitable computing devices. The I/O devices 808 enable a user to interface with the program modules 816. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, or an electronic stylus. Further, the I/O devices 808 may include one or more output devices, such as, but not limited to, a display screen or a printer.

The network devices 810 enable the computer system 800 to communicate with other networks or remote systems via a network, such as the network 104. Examples of the network devices 810 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 9:
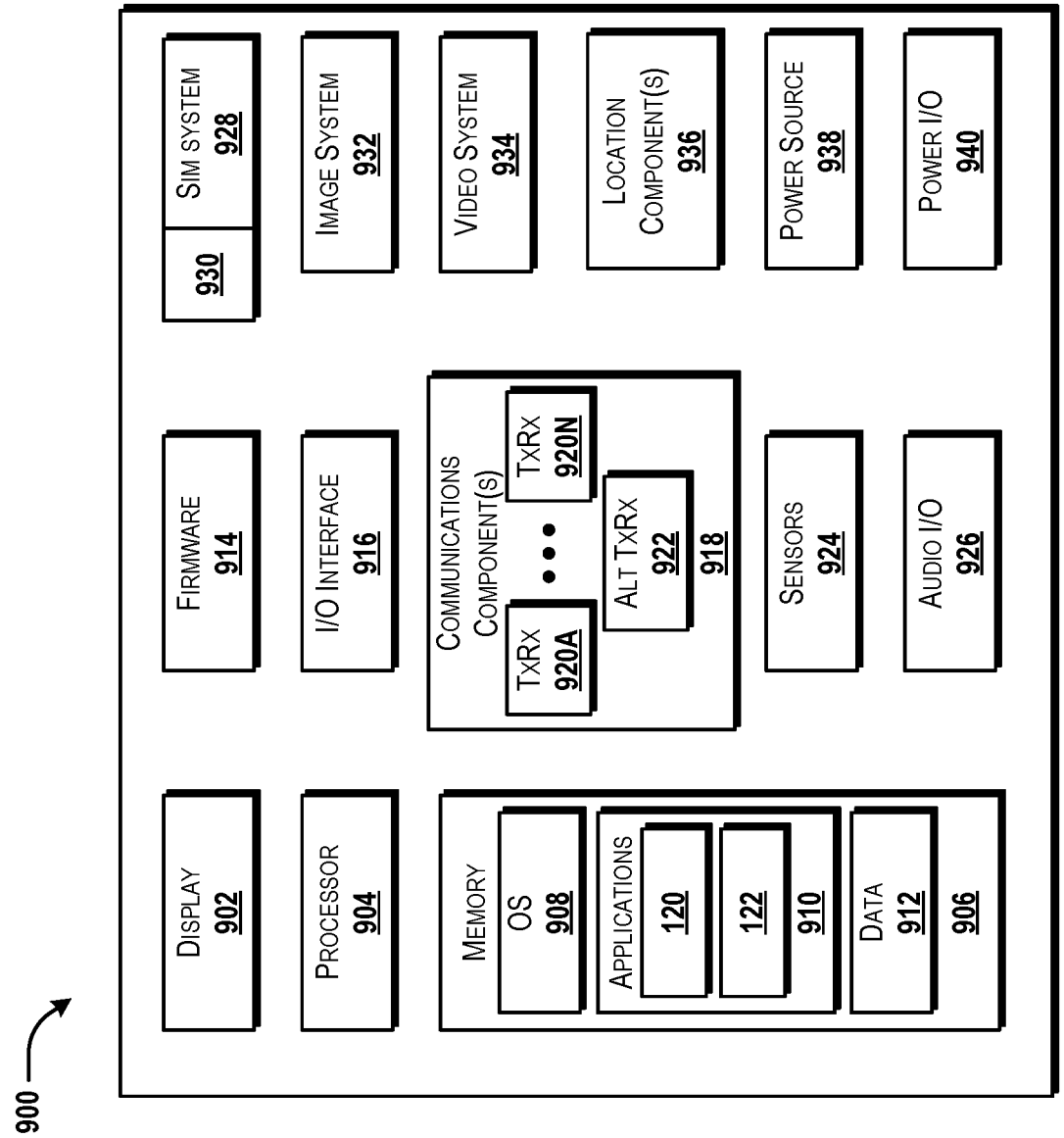
FIG. 9 is a block diagram illustrating an example mobile device configured to interact with a gateway configured to provide gateway certificate management, according to some illustrative embodiments of the concepts and technologies described herein.

Turning now to FIG. 9, an illustrative mobile device 900 and components thereof will be described. In some embodiments, the user device 114 described above with reference to FIGS. 1-6 can be configured as and/or can have an architecture similar or identical to the mobile device 900 described herein in FIG. 9. It should be understood, however, that the user device 114 may or may not include the functionality described herein with reference to FIG. 9. While connections are not shown between the various components illustrated in FIG. 9, it should be understood that some, none, or all of the components illustrated in FIG. 9 can be configured to interact with one another to carry out various device functions. In some embodiments, the components are arranged so as to communicate via one or more busses (not shown). Thus, it should be understood that FIG. 9 and the following description are intended to provide a general understanding of a suitable environment in which various aspects of embodiments can be implemented, and should not be construed as being limiting in any way.

As illustrated in FIG. 9, the mobile device 900 can include a display 902 for displaying data. According to various embodiments, the display 902 can be configured to display various graphical user interface ("GUI") elements such as, for example, a user interface or portal for entering limits on certificates 112 including time and date limits, user limits, context limits, location limits, and content type limits; text; images; video; virtual keypads and/or keyboards; messaging data; notification messages; metadata; internet content; device status; time; date; calendar data; device preferences; map and location data; combinations thereof; and/or the like. The mobile device 900 also can include a processor 904 and a memory or other data storage device ("memory") 906. The processor 904 can be configured to process data and/or can execute computer-executable instructions stored in the memory 906. The computer-executable instructions executed by the processor 904 can include, for example, an operating system 908, one or more applications 910 such as the application programs 120 and the certificate management module 122, other computer-executable instructions stored in a memory 906, or the like. In some embodiments, the applications 910 also can include a UI application (not illustrated in FIG. 9).

The UI application can interface with the operating system 908, such as the operating system 108 shown in FIG. 1, to facilitate user interaction with functionality and/or data stored at the mobile device 900 and/or stored elsewhere. In some embodiments, the operating system 908 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 904 to aid a user in entering content, configuring settings, manipulating address book content and/or settings, multimode interaction, interacting with other applications 910, and otherwise facilitating user interaction with the operating system 908, the applications 910, and/or other types or instances of data 912 that can be stored at the mobile device 900. The data 912 can include, for example, other applications or program modules. According to various embodiments, the data 912 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 910, the data 912, and/or portions thereof can be stored in the memory 906 and/or in a firmware 914, and can be executed by the processor 904.

It can be appreciated that, at least by virtue of storage of the instructions corresponding to the applications 910 and/or other instructions embodying other functionality illustrated and described herein in the memory 906, and/or by virtue of the instructions corresponding to the applications 910 and/or other instructions embodying other functionality illustrated and described herein being accessed and/or executed by the processor 904, the mobile device 900 is a special-purpose mobile device that can facilitate providing the functionality illustrated and described herein. The firmware 914 also can store code for execution during device power up and power down operations. It can be appreciated that the firmware 914 can be stored in a volatile or non-volatile data storage device including, but not limited to, the memory 906 and/or a portion thereof.

The mobile device 900 also can include an input/output ("I/O") interface 916. The I/O interface 916 can be configured to support the input/output of data such as location information, certificates 112, session data 128, user information, organization information, presence status information, user IDs, passwords, and application initiation (start-up) requests. In some embodiments, the I/O interface 916 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 900 can be configured to synchronize with another device to transfer content to and/or from the mobile device 900. In some embodiments, the mobile device 900 can be configured to receive updates to one or more of the applications 910 via the I/O interface 916, though this is not necessarily the case. In some embodiments, the I/O interface 916 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 916 may be used for communications between the mobile device 900 and a network device or local device.

The mobile device 900 also can include a communications component 918. The communications component 918 can be configured to interface with the processor 904 to facilitate wired and/or wireless communications with one or more networks such as the network 104 described herein. In some embodiments, other networks include networks that utilize non-cellular wireless technologies such as WI-FI or WIMAX. In some embodiments, the communications component 918 includes a multimode communications subsystem for facilitating communications via the cellular network and one or more other networks.

The communications component 918, in some embodiments, includes one or more transceivers. The one or more transceivers, if included, can be configured to communicate over the same and/or different wireless technology standards with respect to one another. For example, in some embodiments one or more of the transceivers of the communications component 918 may be configured to communicate using GSM, CDMAONE, CDMA2000, LTE, and various other 2G, 2.5G, 3G, 4G, 5G, 6G, and greater generation technology standards. Moreover, the communications component 918 may facilitate communications over various channel access methods (which may or may not be used by the aforementioned standards) including, but not limited to, TDMA, FDMA, W-CDMA, OFDM, SDMA, and the like.

In addition, the communications component 918 may facilitate data communications using GPRS, EDGE, the HSPA protocol family including HSDPA, EUL or otherwise termed HSUPA, HSPA+, and various other current and future wireless data access standards. In the illustrated embodiment, the communications component 918 can include a first transceiver ("TxRx") 920A that can operate in a first communications mode (e.g., GSM). The communications component 918 also can include an $N^{th}$ transceiver ("TxRx") 920N that can operate in a second communications mode relative to the first transceiver 920A (e.g., UMTS). While two transceivers 920A-N (hereinafter collectively and/or generically referred to as "transceivers 920") are shown in FIG. 9, it should be appreciated that less than two, two, and/or more than two transceivers 920 can be included in the communications component 918.

The communications component 918 also can include an alternative transceiver ("Alt TxRx") 922 for supporting other types and/or standards of communications. According to various contemplated embodiments, the alternative transceiver 922 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 918 also can facilitate reception from terrestrial radio networks, digital satellite radio networks, internet-based radio service networks, combinations thereof, and the like. The communications component 918 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 900 also can include one or more sensors 924. The sensors 924 can include temperature sensors, light sensors, air quality sensors, movement sensors, orientation sensors, noise sensors, proximity sensors, or the like. As such, it should be understood that the sensors 924 can include, but are not limited to, accelerometers, magnetometers, gyroscopes, infrared sensors, noise sensors, microphones, combinations thereof, or the like. Additionally, audio capabilities for the mobile device 900 may be provided by an audio I/O component 926. The audio I/O component 926 of the mobile device 900 can include one or more speakers for the output of audio signals, one or more microphones for the collection and/or input of audio signals, and/or other audio input and/or output devices.

The illustrated mobile device 900 also can include a subscriber identity module ("SIM") system 928. The SIM system 928 can include a universal SIM ("USIM"), a universal integrated circuit card ("UICC") and/or other identity devices. The SIM system 928 can include and/or can be connected to or inserted into an interface such as a slot interface 930. In some embodiments, the slot interface 930 can be configured to accept insertion of other identity cards or modules for accessing various types of networks. Additionally, or alternatively, the slot interface 930 can be configured to accept multiple subscriber identity cards. Because other devices and/or modules for identifying users and/or the mobile device 900 are contemplated, it should be understood that these embodiments are illustrative, and should not be construed as being limiting in any way.

The mobile device 900 also can include an image capture and processing system 932 ("image system"). The image system 932 can be configured to capture or otherwise obtain photos, videos, and/or other visual information. As such, the image system 932 can include cameras, lenses, charge-coupled devices ("CCDs"), combinations thereof, or the like. The mobile device 900 may also include a video system 934. The video system 934 can be configured to capture, process, record, modify, and/or store video content. Photos and videos obtained using the image system 932 and the video system 934, respectively, may be added as message content to an MMS message, email message, and sent to another mobile device. The video and/or photo content also can be shared with other devices via various types of data transfers via wired and/or wireless communication devices as described herein.

The mobile device 900 also can include one or more location components 936. The location components 936 can be configured to send and/or receive signals to determine a geographic location of the mobile device 900. According to various embodiments, the location components 936 can send and/or receive signals from global positioning system ("GPS") devices, assisted-GPS ("A-GPS") devices, WI-FI/WIMAX and/or cellular network triangulation data, combinations thereof, and the like. The location component 936 also can be configured to communicate with the communications component 918 to retrieve triangulation data for determining a location of the mobile device 900. In some embodiments, the location component 936 can interface with cellular network nodes, telephone lines, satellites, location transmitters and/or beacons, wireless network transmitters and receivers, combinations thereof, and the like. In some embodiments, the location component 936 can include and/or can communicate with one or more of the sensors 924 such as a compass, an accelerometer, and/or a gyroscope to determine the orientation of the mobile device 900. Using the location component 936, the mobile device 900 can generate and/or receive data to identify its geographic location, or to transmit data used by other devices to determine the location of the mobile device 900. The location component 936 may include multiple components for determining the location and/or orientation of the mobile device 900.

The illustrated mobile device 900 also can include a power source 938. The power source 938 can include one or more batteries, power supplies, power cells, and/or other power subsystems including alternating current ("AC") and/or direct current ("DC") power devices. The power source 938 also can interface with an external power system or charging equipment via a power I/O component 940. Because the mobile device 900 can include additional and/or alternative components, the above embodiment should be understood as being illustrative of one possible operating environment for various embodiments of the concepts and technologies described herein. The described embodiment of the mobile device 900 is illustrative, and should not be construed as being limiting in any way.

Figure 10:
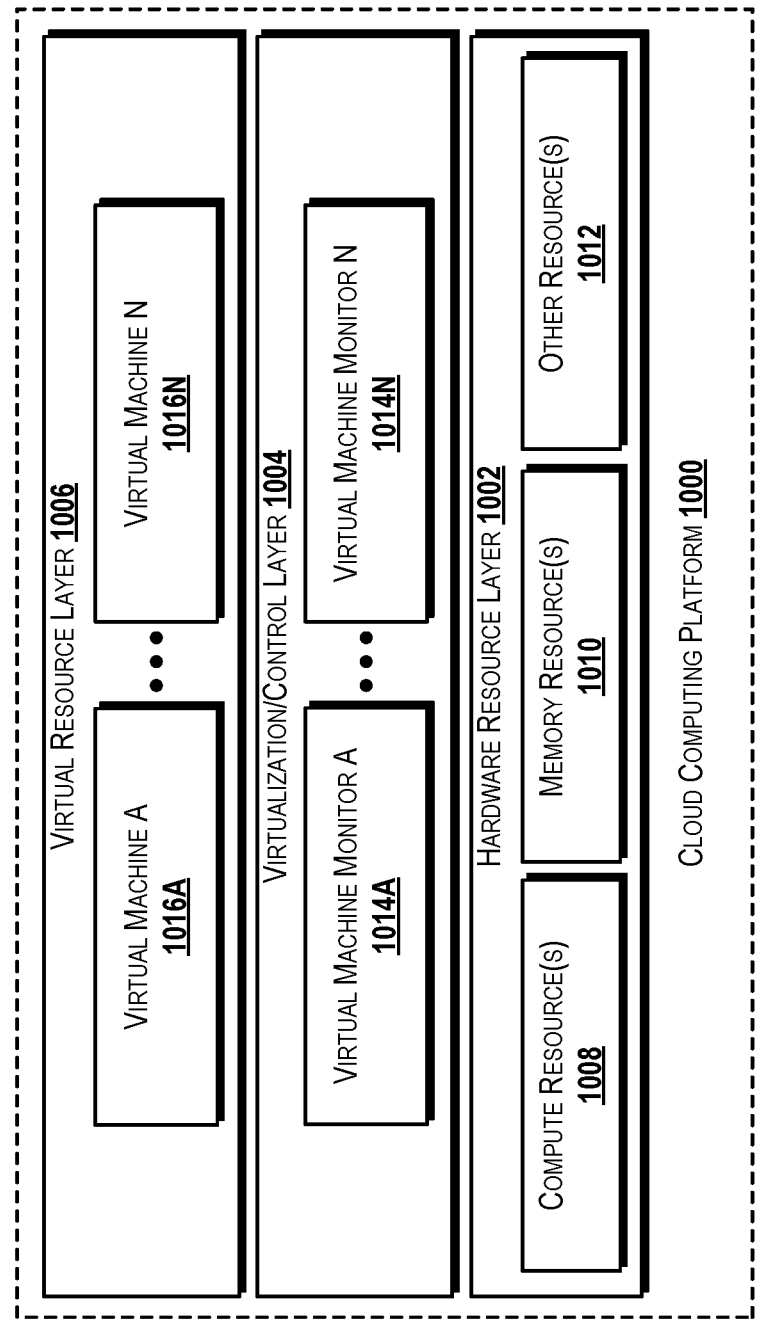
FIG. 10 is a diagram illustrating a computing environment capable of implementing some aspects of the concepts and technologies disclosed herein, according to some illustrative embodiments of the concepts and technologies described herein.

FIG. 10 illustrates an illustrative architecture for a cloud computing platform 1000 that can be capable of executing the software components described herein for gateway certificate management and/or for providing and/or interacting with the certificate management application 110 executed by a gateway device 102. Thus, it can be appreciated that in some embodiments of the concepts and technologies disclosed herein, the cloud computing platform 1000 illustrated in FIG. 10 can be used to provide the functionality described herein with respect to the gateway device 102 and/or one or more of the resources 116.

The cloud computing platform 1000 thus may be utilized to execute any aspects of the software components presented herein. Thus, according to various embodiments of the concepts and technologies disclosed herein, the certificate management application 110, the profile generator module 130, and/or the session data analysis module 132, can be implemented, at least in part, on or by elements included in the cloud computing platform 1000 illustrated and described herein. Those skilled in the art will appreciate that the illustrated cloud computing platform 1000 is a simplification of but only one possible implementation of an illustrative cloud computing platform, and as such, the illustrated cloud computing platform 1000 should not be construed as being limiting in any way.

In the illustrated embodiment, the cloud computing platform 1000 can include a hardware resource layer 1002, a virtualization/control layer 1004, and a virtual resource layer 1006. These layers and/or other layers can be configured to cooperate with each other and/or other elements of a cloud computing platform 1000 to perform operations as will be described in detail herein. While connections are shown between some of the components illustrated in FIG. 10, it should be understood that some, none, or all of the components illustrated in FIG. 10 can be configured to interact with one another to carry out various functions described herein. In some embodiments, the components are arranged so as to communicate via one or more networks such as, for example, the network 104 illustrated and described hereinabove (not shown in FIG. 10). Thus, it should be understood that FIG. 10 and the following description are intended to provide a general understanding of a suitable environment in which various aspects of embodiments can be implemented, and should not be construed as being limiting in any way.

The hardware resource layer 1002 can provide hardware resources. In the illustrated embodiment, the hardware resources can include one or more compute resources 1008, one or more memory resources 1010, and one or more other resources 1012. The compute resource(s) 1008 can include one or more hardware components that can perform computations to process data, and/or to execute computer-executable instructions of one or more application programs, operating systems, services, and/or other software including those illustrated and described herein.

According to various embodiments, the compute resources 1008 can include one or more central processing units ("CPUs"). The CPUs can be configured with one or more processing cores. In some embodiments, the compute resources 1008 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 1008 can include one or more discrete GPUs. In some other embodiments, the compute resources 1008 can include one or more CPU and/or GPU components that can be configured in accordance with a co-processing CPU/GPU computing model. Thus, it can be appreciated that in some embodiments of the compute resources 1008, a sequential part of an application can execute on a CPU and a computationally-intensive part of the application can be accelerated by the GPU. It should be understood that this example is illustrative, and therefore should not be construed as being limiting in any way.

In some embodiments, the compute resources 1008 also can include one or more system on a chip ("SoC") components. It should be understood that an SoC component can operate in association with one or more other components as illustrated and described herein, for example, one or more of the memory resources 1010 and/or one or more of the other resources 1012. In some embodiments in which an SoC component is included, the compute resources 1008 can be or can include one or more embodiments of the SNAPDRAGON brand family of SoCs, available from QUALCOMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 1008 can be or can include one or more hardware components arranged in accordance with an ARM architecture, available for license from ARM HOLDINGS of Cambridge, United Kingdom. Alternatively, the compute resources 1008 can be or can include one or more hardware components arranged in accordance with an x86 architecture, such as an architecture available from INTEL CORPORATION of Mountain View, California, and others. Those skilled in the art will appreciate the implementation of the compute resources 1008 can utilize various computation architectures and/or processing architectures. As such, the various example embodiments of the compute resources 1008 as mentioned hereinabove should not be construed as being limiting in any way. Rather, implementations of embodiments of the concepts and technologies disclosed herein can be implemented using compute resources 1008 having any of the particular computation architecture and/or combination of computation architectures mentioned herein as well as other architectures.

Although not separately illustrated in FIG. 10, it should be understood that the compute resources 1008 illustrated and described herein can host and/or execute various services, applications, portals, and/or other functionality illustrated and described herein. Thus, the compute resources 1008 can host and/or can execute the certificate management application 110, the profile generator module 130, the session data analysis module 132, or other applications or services illustrated and described herein.

The memory resource(s) 1010 can include one or more hardware components that can perform or provide storage operations, including temporary and/or permanent storage operations. In some embodiments, the memory resource(s) 1010 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 1008, subject to the definition of "computer storage media" provided above (e.g., as excluding waves and signals per se and/or communication media as defined in this application).

Although not illustrated in FIG. 10, it should be understood that the memory resources 1010 can host or store the various data illustrated and described herein including, but not limited to, the certificates 112, the profiles 118, the setup communications 126, the session data 128, the resources 116, and/or other data, if desired. It should be understood that this example is illustrative, and therefore should not be construed as being limiting in any way.

The other resource(s) 1012 can include any other hardware resources that can be utilized by the compute resources (s) 1008 and/or the memory resource(s) 1010 to perform operations. The other resource(s) 1012 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 1002 can be virtualized by one or more virtual machine monitors ("VMMs") 1014A-1014N (also known as "hypervisors;" hereinafter "VMMs 1014"). The VMMs 1014 can operate within the virtualization/control layer 1004 to manage one or more virtual resources that can reside in the virtual resource layer 1006. The VMMs 1014 can be or can include software, firmware, and/or hardware that alone or in combination with other software, firmware, and/or hardware, can manage one or more virtual resources operating within the virtual resource layer 1006.

The virtual resources operating within the virtual resource layer 1006 can include abstractions of at least a portion of the compute resources 1008, the memory resources 1010, the other resources 1012, or any combination thereof. These abstractions are referred to herein as virtual machines ("VMs"). In the illustrated embodiment, the virtual resource layer 1006 includes VMs 1016A-1016N (hereinafter "VMs 1016").

Based on the foregoing, it should be appreciated that systems and methods for gateway certificate management have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising a processor and a memory that stores computer-executable instructions that, when executed by the processor, cause the processor to perform operations comprising:
   detecting, at a gateway device, a connection comprising a local communication channel between the gateway device and a user device, wherein the gateway device is located at a premises and wherein the user device is located at the premises, and wherein the connection is created to request communications between the user device and a resource that is not located at the premises;
   determining, based on analyzing a profile for the user device and a context associated with the communications, if a certificate that is used to establish a secure communication channel should be generated by the gateway device for the communications requested via the connection, wherein the profile for the user device comprises configurations, settings, and limits defined for the user device, and wherein the context comprises information identifying a type of data to be communicated via the communications;
   in response to determining that the certificate should be issued for the communications, generating the certificate, wherein the certificate comprises custom certificate data comprising communication context data that defines the type of data, and wherein the certificate authorizes the user device to send and receive the type of data; and
   providing, to the user device and to the resource, the certificate to enable the communications via the secure communication channel, whereby the user device is allowed to communicate with the resource via the gateway device to send and receive the type of data, wherein the gateway device provides a first copy of the certificate to the user device via the local communication channel, wherein the gateway device provides a second copy of the certificate to the resource via the secure communication channel, wherein the gateway device maintains a copy of the certificate, and wherein the gateway device is configured to revoke the certificate to teardown the local communication channel and to terminate the communications.

2. The system of claim 1, wherein the information of the context further identifies:
   a timing associated with the communications;
   an application used by the user device to send and receive session data associated with the communications; and
   a user associated with the user device for the communications.

3. The system of claim 2, wherein the custom certificate data further comprises:
   user data that identifies users authorized to send and receive the communications, the users comprising the user;
   time data that identifies times at which the user device is authorized to send and receive the communications; and
   application data that identifies the application that can be used to send and receive the communications.

4. The system of claim 3, wherein the time data defines:
   a first time of day at which the user device can send and receive the communications; and
   a second time of day at which the user device can not send and receive the communications.

5. The system of claim 1, wherein the type of data is determined by a session data analysis module executed by the gateway device, and wherein the session data analysis module analyzes the communications to determine content being sent and received via the communications, the content indicating the type of data.

6. The system of claim 5, wherein the computer-executable instructions, when executed by the processor, cause the processor to perform operations further comprising:
   analyzing, during the communications, the content to determine that the communications are not authorized by the certificate; and
   issuing, during the communications, a modification to the certificate in response to the determining, wherein the modification suspends the communications.

7. The system of claim 6, wherein analyzing the content comprises analyzing a screenshot associated with the content to identify the type of data and the context, and wherein issuing the modification comprises changing time data associated with the certificate to temporarily suspend validity of the certificate.

8. A method comprising:
   detecting, at a gateway device comprising a processor, a connection comprising a local communication channel between the gateway device and a user device, wherein the gateway device is located at a premises and wherein the user device is located at the premises, and wherein the connection is created to request communications between the user device and a resource that is not located at the premises;
   determining, by the gateway device and based on analyzing a profile for the user device and a context associated with the communications, if a certificate that is used to establish a secure communication channel should be generated by the gateway device for the communications requested via the connection, wherein the profile for the user device comprises configurations, settings, and limits defined for the user device, and wherein the context comprises information identifying a type of data to be communicated via the communications;
   in response to determining that the certificate should be issued for the communications, generating, by the gateway device, the certificate, wherein the certificate comprises custom certificate data comprising communication context data that defines the type of data, and wherein the certificate authorizes the user device to send and receive the type of data; and
   providing, by the gateway device and to the user device and to the resource, the certificate to enable the communications via the secure communication channel, whereby the user device is allowed to communicate with the resource via the gateway device to send and receive the type of data, wherein the gateway device provides a first copy of the certificate to the user device via the local communication channel, wherein the gateway device provides a second copy of the certificate to the resource via the secure communication channel, wherein the gateway device maintains a copy of the certificate, and wherein the gateway device is configured to revoke the certificate to teardown the local communication channel and to terminate the communications.

9. The method of claim 8, wherein the information of the context further identifies:
   a timing associated with the communications;

an application used by the user device to send and receive session data associated with the communications; and a user associated with the user device for the communications.

10. The method of claim 9, wherein the custom certificate data further comprises:

user data that identifies users authorized to send and receive the communications, the users comprising the user;

time data that identifies times at which the user device is authorized to send and receive the communications; and application data that identifies the application that can be used to send and receive the communications.

11. The method of claim 10, wherein the time data defines:

a first time of day at which the user device can send and receive the communications; and a second time of day at which the user device can not send and receive the communications.

12. The method of claim 8, wherein the type of data is determined by a session data analysis module executed by the gateway device, and wherein the session data analysis module analyzes the communications to determine content being sent and received via the communications, the content indicating the type of data.

13. The method of claim 12, further comprising:

analyzing, during the communications, the content to determine that the communications are not authorized by the certificate, wherein analyzing the content comprises analyzing a screenshot associated with the content; and issuing, during the communications, a modification to the certificate in response to the determining, wherein the modification suspends the communications, wherein issuing the modification comprises changing time data associated with the certificate to temporarily suspend validity of the certificate.

14. A computer storage medium having computer-executable instructions stored thereon that, when executed by a processor, cause the processor to perform operations comprising:

detecting, at a gateway device, a connection comprising a local communication channel between the gateway device and a user device, wherein the gateway device is located at a premises and wherein the user device is located at the premises, and wherein the connection is created to request communications between the user device and a resource that is not located at the premises;

determining, based on analyzing a profile for the user device and a context associated with the communications, if a certificate that is used to establish a secure communication channel should be generated by the gateway device for the communications requested via the connection, wherein the profile for the user device comprises configurations, settings, and limits defined for the user device, and wherein the context comprises information identifying a type of data to be communicated via the communications;

in response to determining that the certificate should be issued for the communications, generating the certificate, wherein the certificate comprises custom certificate data comprising communication context data that defines the type of data, and wherein the certificate authorizes the user device to send and receive the type of data; and providing, to the user device and to the resource, the certificate to enable the communications via the secure communication channel, whereby the user device is allowed to communicate with the resource via the gateway device to send and receive the type of data, wherein the gateway device provides a first copy of the certificate to the user device via the local communication channel, wherein the gateway device provides a second copy of the certificate to the resource via the secure communication channel, wherein the gateway device maintains a copy of the certificate, and wherein the gateway device is configured to revoke the certificate to teardown the local communication channel and to terminate the communications.

15. The computer storage medium of claim 14, wherein the information of the context further:

a timing associated with the communications;

an application used by the user device to send and receive session data associated with the communications; and a user associated with the user device for the communications.

16. The computer storage medium of claim 15, wherein the custom certificate data further comprises:

user data that identifies users authorized to send and receive the communications, the users comprising the user;

time data that identifies times at which the user device is authorized to send and receive the communications; and application data that identifies the application that can be used to send and receive the communications.

17. The computer storage medium of claim 16, wherein the time data defines:

a first time of day at which the user device can send and receive the communications; and a second time of day at which the user device can not send and receive the communications.

18. The computer storage medium of claim 14, wherein the type of data is determined by a session data analysis module executed by the gateway device, and wherein the session data analysis module analyzes the communications to determine content being sent and received via the communications, the content indicating the type of data.

19. The computer storage medium of claim 18, wherein the computer-executable instructions, when executed by the processor, cause the processor to perform operations further comprising:

analyzing, during the communications, the content to determine that the communications are not authorized by the certificate; and issuing, during the communications, a modification to the certificate in response to the determining, wherein the modification suspends the communications.

20. The computer storage medium of claim 19, wherein analyzing the content comprises analyzing a screenshot associated with the content to identify the type of data and the context, and wherein issuing the modification comprises changing time data associated with the certificate to temporarily suspend validity of the certificate.

* * * * *